(12) United States Patent
Tiffany et al.

(10) Patent No.: US 9,943,757 B2
(45) Date of Patent: Apr. 17, 2018

(54) ADJUSTABLE TENSION THUMBSTICK

(71) Applicant: Microsoft Technology Licensing, LLC, Redmond, WA (US)

(72) Inventors: Dustin Tiffany, Kirkland, WA (US); Aaron Schmitz, Redmond, WA (US); Benjamin Michael Finney, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 86 days.

(21) Appl. No.: 15/192,843

(22) Filed: Jun. 24, 2016

(65) Prior Publication Data

US 2017/0368451 A1 Dec. 28, 2017

(51) Int. Cl.
*A63F 13/24* (2014.01)

(52) U.S. Cl.
CPC .................... *A63F 13/24* (2014.09)

(58) Field of Classification Search
CPC ............................ A63F 13/24; A63F 13/06
USPC ............................................ 463/38
See application file for complete search history.

(56) References Cited

U.S. PATENT DOCUMENTS

| | | |
|---|---|---|
| 4,395,134 A | 7/1983 | Luce |
| 4,590,339 A | 5/1986 | Scott-Jackson et al. |
| 4,721,274 A | 1/1988 | Erb |
| 6,362,810 B1 | 3/2002 | Matsuda |
| 6,892,597 B2 | 5/2005 | Tews |
| 7,338,374 B2 | 3/2008 | Hammond et al. |
| 7,463,241 B2 | 12/2008 | Ushimaru et al. |
| 7,758,424 B2 | 7/2010 | Riggs et al. |
| 7,993,203 B1 | 8/2011 | Walker, II et al. |

(Continued)

FOREIGN PATENT DOCUMENTS

| | | |
|---|---|---|
| CA | 2147575 A1 | 10/1996 |
| CN | 2843562 Y | 12/2006 |

(Continued)

OTHER PUBLICATIONS

"Gamester Phoenix Revolution—Instruction Manual", http://service.mattel.com/instruction_sheets/I4160.pdf, Jul. 6, 2004, 1 page.

(Continued)

*Primary Examiner* — Jason Skaarup
(74) *Attorney, Agent, or Firm* — Alleman Hall Creasman & Tuttle LLP

(57) ABSTRACT

A thumbstick for a user input device comprises an adjustable tensioning mechanism configured to modify a tilt tension of a tiltable post. The tiltable post is operable to output a control signal based on a position of the tiltable post relative to a default position. The thumbstick comprises a cap with a cylindrical stem that defines a cavity. An engagement body is located within the cavity and contacts an engagement surface of the adjustable tensioning mechanism. The engagement body includes a cam surface disposed around an axis of the tiltable post. An adjustment body within the cavity of the stem comprises a follower that contacts the cam surface. The follower is configured to traverse the cam surface when the cap is rotated to thereby translate the engagement body along the axis of the tiltable post and adjust the tilt tension of the tiltable post.

20 Claims, 15 Drawing Sheets

(56) References Cited

U.S. PATENT DOCUMENTS

| | | | |
|---|---|---|---|
| 8,264,458 | B2 | 9/2012 | Cooper et al. |
| 8,496,528 | B2 | 7/2013 | Muramatsu |
| 8,519,282 | B2 | 8/2013 | Ohshima et al. |
| 8,784,208 | B2 | 7/2014 | Borrel |
| 2005/0255915 | A1 | 11/2005 | Riggs et al. |
| 2005/0255918 | A1 | 11/2005 | Riggs et al. |
| 2005/0277470 | A1* | 12/2005 | Watanachote ......... A63F 13/06 463/37 |
| 2007/0164996 | A1 | 7/2007 | Gould |
| 2009/0239665 | A1 | 9/2009 | Minuto et al. |
| 2010/0167825 | A1 | 7/2010 | Sternberg et al. |
| 2010/0298053 | A1 | 11/2010 | Kotkin |
| 2011/0240454 | A1 | 10/2011 | Ohshima et al. |
| 2012/0172128 | A1 | 7/2012 | Atzmon |
| 2012/0188156 | A1* | 7/2012 | Takahashi ............... A63F 13/06 345/156 |
| 2012/0274563 | A1* | 11/2012 | Olsson .................. G05G 9/047 345/161 |
| 2016/0346680 | A1* | 12/2016 | Tsai ....................... A63F 13/24 |
| 2016/0346681 | A1* | 12/2016 | Tsai ....................... A63F 13/27 |
| 2016/0361634 | A1 | 12/2016 | Gassoway et al. |
| 2017/0001106 | A1 | 1/2017 | Gassoway et al. |

FOREIGN PATENT DOCUMENTS

| | | |
|---|---|---|
| JP | 2000089847 A | 3/2000 |
| KR | 101124507 B1 | 3/2012 |
| WO | 2005049159 A2 | 6/2005 |
| WO | 2017003675 A1 | 1/2017 |

OTHER PUBLICATIONS

Hsai, "Razer Onza Tournament Edition Wired Xbox360 Controller", PinoyXbox website, Xbox 360 Forums, http://www.pinoyxbox.com/forum/viewtopic.php?f=11&t=38391, Feb. 8, 2011, 2 pages.

Ashcraft, B., "Just How Good Is the Razer Onza Tournament Edition? Quite Good.", KOTAU website, http://kotaku.com/5793875/just-how-good-is-the-razer-onza-tournament-edition-quite-good/, Apr. 20, 2011, 17 pages.

"Xbox 360 Controller Razer Onza Tournament Edition", GameStop website, http://www.gamestop.com/xbox-360/accessories/xbox-360-controller-razer-onza-tournament-edition/97812, Nov. 28, 2011, 7 pages.

Pionneau, F., "Review / Mad Catz MLG Pro Circuit Controller", Digital Versus website, http://www.digitalversus.com/gamepad-controller/madcatz-mlg-pro-circuit-controller-p14514/test.html, Oct. 10, 2012, 7 pages.

Dikeman, A., "Battle Beaver Custom's Controller Review", Halo Follower website, http://halofollower.com/battle-beaver-customs-controller-review/, Jan. 8, 2015, 4 pages.

Interference Fit, Wikipedia Website, Available Online at https://en.wikipedia.org/wiki/Interference_fit, Website Available as Early as Dec. 15, 2005, Retrieved Dec. 2, 2016, 3 pages.

Brooks, D. et al., "Design of a Haptic Joystick for Shared Robot Control," Proceedings of the Seventh Annual ACM/IEEE International Conference on Human-Robot Interaction (HRI '12), Mar. 5, 2012, Boston, Massachusetts, 2 pages.

Tiffany, Dustin et al., "Adjustable Tension Thumbstick," U.S. Appl. No. 15/192,897, filed Jun. 24, 2016, 84 pages.

"Grass Valley OCP 400 User Manual: Joystick", Retrieved on: Apr. 21, 2016, Available at: http://www.manualslib.com/manual/904041/Grass-Valley-Ocp-400.html?page=11.

Davies, Chris, "Xbox One controller gets deep-dive treatment", Published on: Jun. 6, 2013, Available at: http://www.slashgear.com/xbox-one-controller-gets-deep-dive-treatment-06285219/.

Scott, Dave, ""Two Finger Solution"—Transmitter Handling Tips to Maximize Flying Consistency and Proficiency", Published on: Jan. 22, 2013, Available at: http://www.rcflightschool.com/TransmitterHandling.pdf.

"Spektrum DX8 Instruction Manual: Adjustable Stick Tension; Advanced Range Testing", Retrieved on: Apr. 21, 2016, Available at: http://www.manualslib.com/manual/730948/Spekctrum-Dx8.html?page=41.

"International Search Report and Written Opinion Issued in PCT Application No. PCT/US2017/037089", dated Aug. 21, 2017, 11 Pages.

* cited by examiner

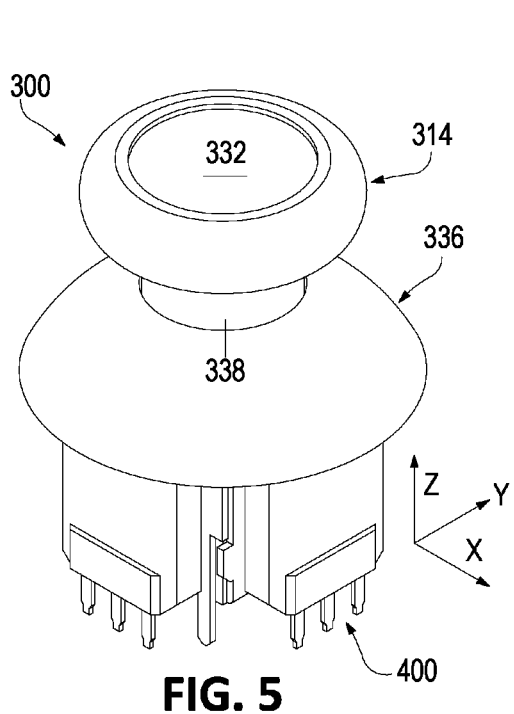
FIG. 5
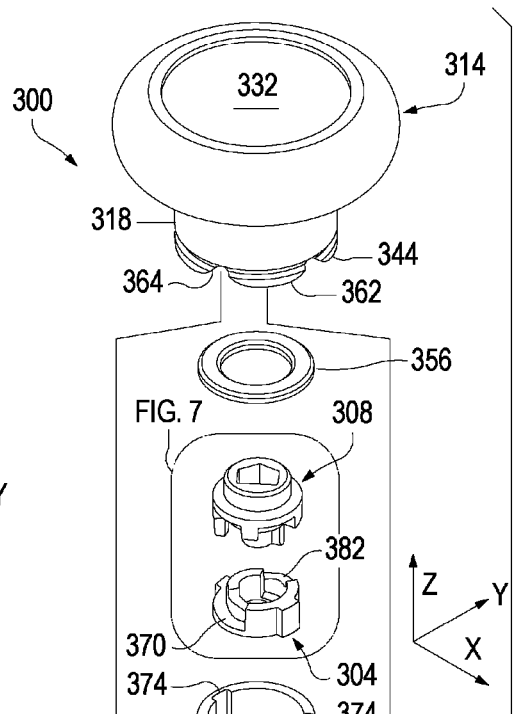
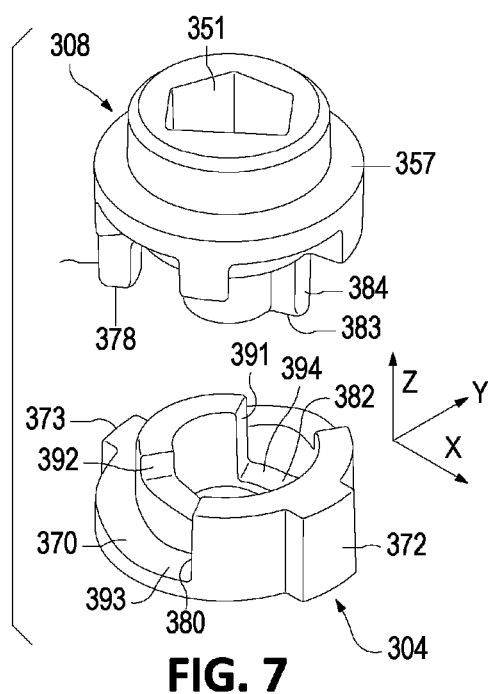
FIG. 7
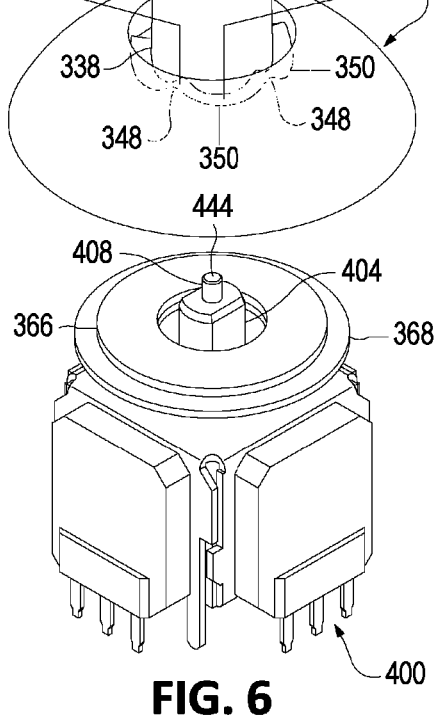
FIG. 6

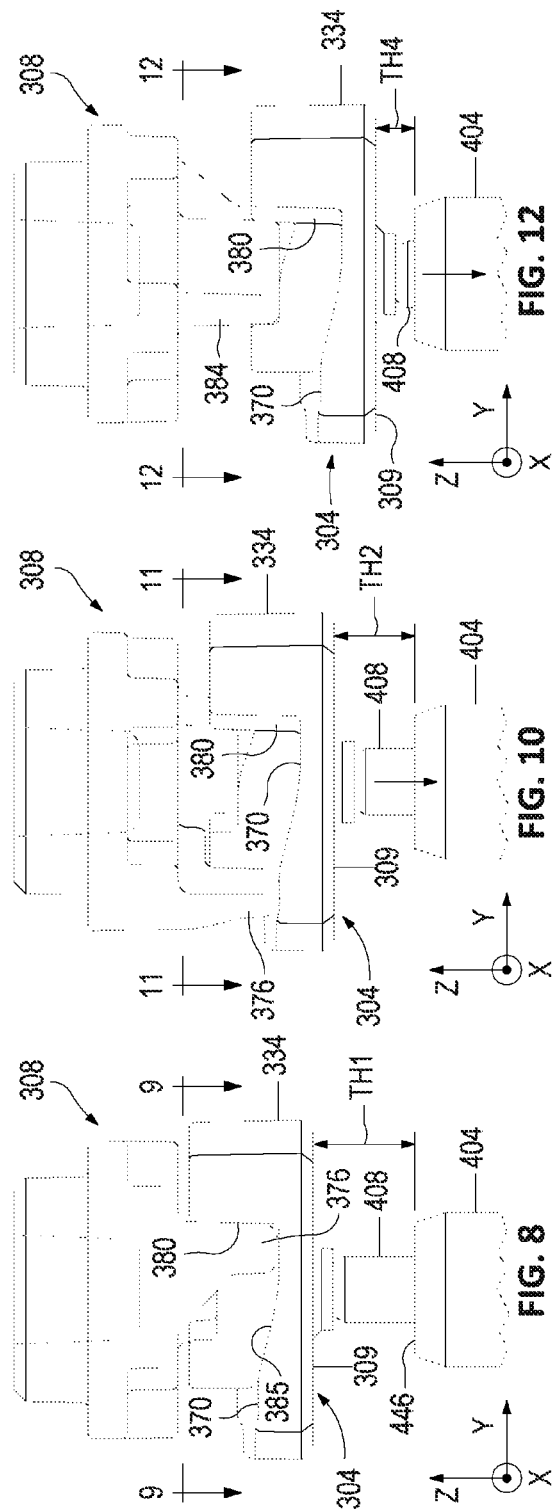

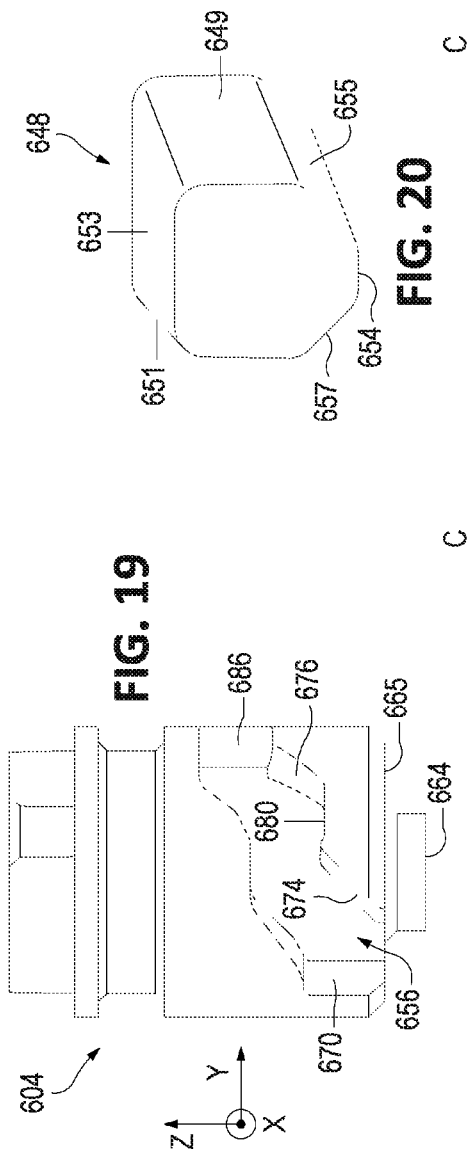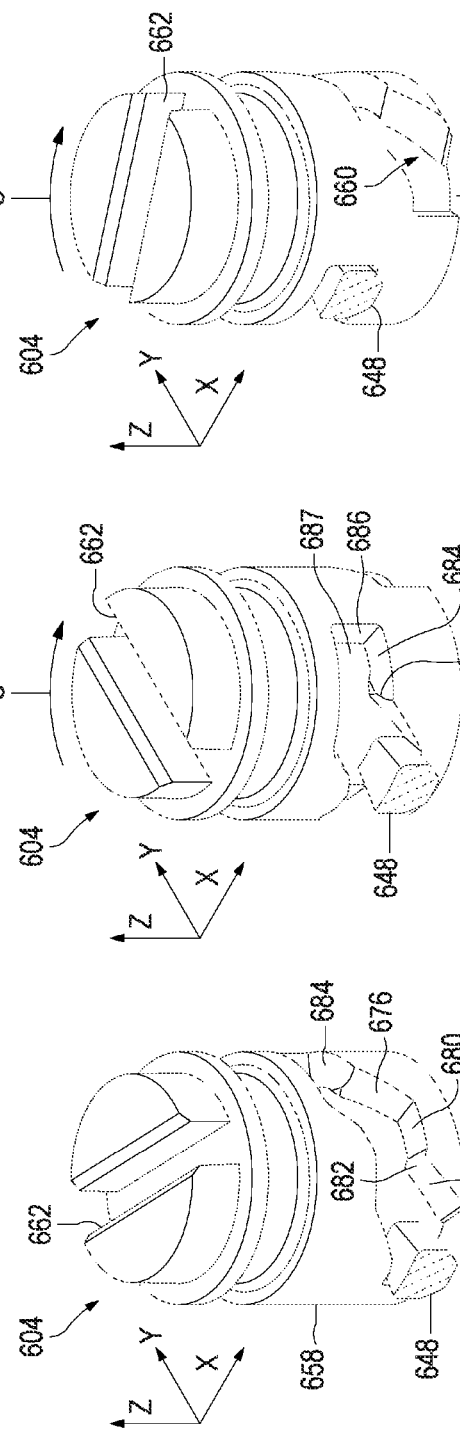

ADJUSTABLE TENSION THUMBSTICK

BACKGROUND

Handheld device controllers may include one or more thumbsticks that enable users to provide input. A thumbstick may be a stick-shaped feature that is positioned to be manipulated by a thumb of a user. Different users may have different preferences for an amount of tension that resists the thumbstick being tilted. A thumbstick with greater tension provides greater resistance to being tilted by a user relative to a thumbstick with lesser tension.

SUMMARY

In some examples, a thumbstick for a user input device may comprise an adjustable tensioning mechanism configured to modify a tilt tension of a tiltable post. The tiltable post may be operable to output a control signal based on a position of the tiltable post relative to a default position. A cap of the thumbstick comprises a cylindrical stem that defines a cavity. An engagement body is located within the cavity and contacts an engagement surface of the adjustable tensioning mechanism.

The engagement body comprises a cam surface disposed around an axis of the tiltable post. An adjustment body is located within the cavity of the stem and comprises a follower contacting the cam surface. The follower is configured to traverse the cam surface when the cap is rotated to thereby translate the engagement body along the axis of the tiltable post and adjust the tilt tension of the tiltable post.

In some examples, a thumbstick for a user input device may comprise an adjustable tensioning mechanism configured to modify a tilt tension of a tiltable post, wherein the tiltable post is operable to output a control signal based on a position of the tiltable post relative to a default position. The thumbstick may include a cap comprising a cylindrical stem that defines a first cavity. A base of the thumbstick is movable with the tiltable post, with the base comprising a cylindrical portion extending into the first cavity of the cylindrical stem, and the cylindrical portion defining a second cavity and comprising a protuberance projecting into the second cavity.

An adjustment body may be located within the second cavity of the cylindrical portion, with the adjustment body comprising a contacting surface at a distal end that contacts an engagement surface of the adjustable tensioning mechanism, and a slot recessed into a face of the adjustment body, with the slot extending around a portion of the face. The protuberance of the cylindrical portion is configured to extend into the slot, and the slot is configured to engage the protuberance when the adjustment body is rotated and translated from a first orientation to a second orientation to adjust the tilt tension of the tiltable post.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5 shows a perspective view of the thumbstick of FIG. 3 according to examples of the present disclosure.

FIG. 6 is an exploded view of the thumbstick of FIG. 3 showing an adjustment body and an engagement body according to examples of the present disclosure.

FIG. 7 shows a detailed perspective view of the adjustment body and engagement body of the thumbstick of FIG. 6.

FIG. 8 shows a side view of the adjustment body and engagement body of the thumbstick of FIG. 3 in a minimum-tension orientation according to examples of the present disclosure.

FIG. 9 is a top view of the adjustment body and engagement body of FIG. 8 in the minimum-tension orientation.

FIG. 10 shows a side view of the adjustment body and engagement body of the thumbstick of FIG. 3 in another tension orientation greater than the minimum-tension orientation according to examples of the present disclosure.

FIG. 11 is a top view of the adjustment body and engagement body of FIG. 10 in the other tension orientation.

FIG. 12 shows a side view of the adjustment body and engagement body of the thumbstick of FIG. 3 in a maximum tension orientation according to examples of the present disclosure.

FIG. 13 is a top view of the adjustment body and engagement body of FIG. 12 in the maximum tension orientation.

FIG. 19 shows a side view of the adjustment body of FIG. 17 according to examples of the present disclosure.

FIG. 20 is a perspective view of a protuberance of the thumbstick of FIG. 16 according to examples of the present disclosure.

FIG. 21 is a perspective view of the adjustment body and a protuberance of the thumbstick of FIG. 16 in a minimum-tension orientation according to examples of the present disclosure.

FIG. 22 shows a perspective view of the adjustment body and protuberance of FIG. 21 in another tension orientation greater than the minimum-tension orientation according to examples of the present disclosure.

FIG. 23 shows a perspective view of the adjustment body and protuberance of FIG. 21 in a maximum tension orientation according to examples of the present disclosure.

DETAILED DESCRIPTION

Figure 1:
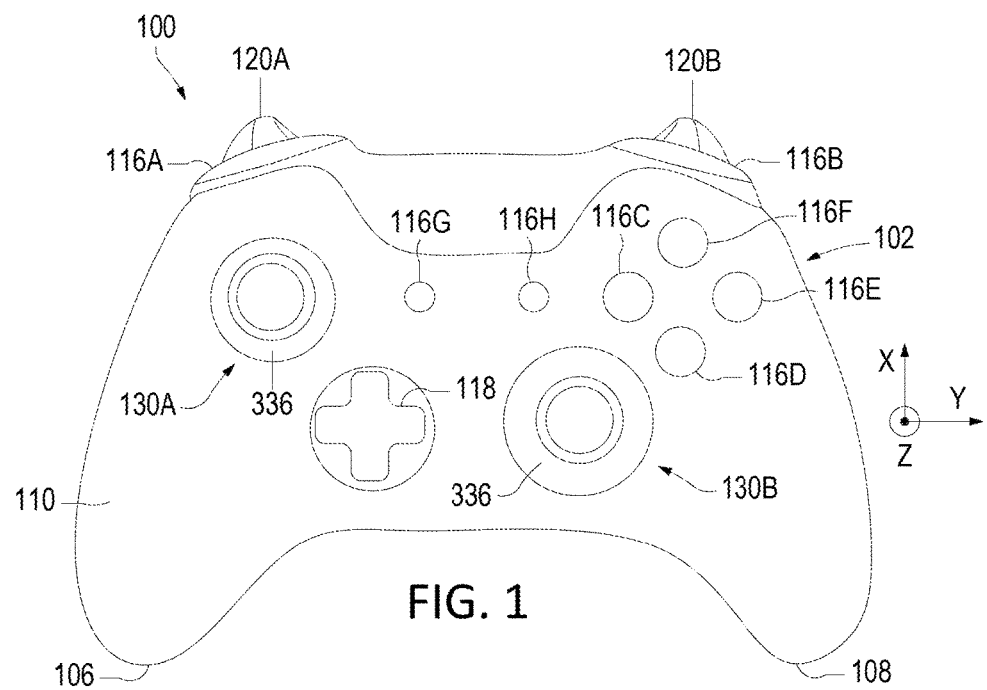
FIG. 1 shows a top view of a game controller that includes two thumbsticks according to examples of the present disclosure.

User input devices may include one or more user-actuatable control elements with which a user may provide input. Each of these control elements may be manipulated by a user to generate various control signals for interacting with another machine or device. For example, a user input device may be designed to be held in two hands and may include one or more user-actuatable thumbsticks, buttons, triggers, directional pads, touch pads, etc.

Examples of such user input devices include game controllers that may be designed to facilitate user interaction with a video game or other application executing on a computer, video game console, or other platform. For example, a game controller may provide a means by which a user can control a character or object within a video game. Other handheld user input device may be used to remotely control a vehicle or other machine, such as an unmanned aircraft (e.g., a drone) or a land-based vehicle.

As noted above, some user input devices may include one or more thumb sticks. A thumbstick is a user input device component that may be manipulated by a user along two or more axes for controlling or otherwise interacting with a machine, computing device, computer program such as a video game or other application, etc. For example and as explained in more detail below, a thumbstick may be configured for manipulation about a pivoting base portion. In some examples a thumbstick configured for manipulation about a pivoting portion also may be configured to receive a click selection along another axis.

Different users may have different preferences for the tension applied to a thumbstick during manipulation. For example, a thumbstick with higher tension provides greater resistance to being tilted by a user's thumb or finger relative to a thumbstick with lesser tension. Some game players (e.g., garners) may prefer higher tilt tension in a thumbstick, while others may prefer a lower tilt tension. Accordingly, examples disclosed herein provide thumbsticks and associated user input devices that enable a user to conveniently adjust thumbstick tension to their preference.

Furthermore and as explained in more detail below, thumbstick tilt tension may be adjusted and the thumbstick may be utilized at different tension settings without changing the height of the thumbstick relative to the hand-held body of the user input device. In this manner, users may utilize a thumbstick at different tension settings while also maintaining a constant thumbstick height at the various tension settings. Accordingly, thumbstick tension may be adjusted without changing the thumbstick height relative to the hand-held body of the user input device.

Accordingly, the present disclosure is directed to thumbsticks for user input devices that include an adjustable tensioning mechanism configured to modify a tilt tension of a tiltable post, and corresponding methods for adjusting a tilt tension of a thumbstick. The tiltable post may be operable to output a control signal based on a position of the tiltable post relative to a default position. A cap of the thumbstick comprises a cylindrical stem that defines a cavity. In some examples, an engagement body is located within the cavity and contacts an engagement surface of the adjustable tensioning mechanism. The engagement body may comprise a cam surface disposed around an axis of the tiltable post. An adjustment body may be located within the cavity of the stem and may comprise a follower contacting the cam surface. The follower is configured to traverse the cam surface when the cap is rotated, or in other examples when the cap is removed and the adjustment body is rotated, to thereby translate the engagement body along the axis of the tiltable post and adjust the tilt tension of the tiltable post.

In some examples, a thumbstick may comprise a base that is movable with the tiltable post, with the base comprising a cylindrical portion extending into the first cavity of the cylindrical stem. The cylindrical portion may define a second cavity and may comprise a protuberance projecting into the second cavity. An adjustment body may be located within the second cavity of the cylindrical portion, with the adjustment body comprising a contacting surface at a distal end that contacts an engagement surface of the adjustable tensioning mechanism at a contact point. In this example, the adjustment body may comprise a slot recessed into a face of the adjustment body, with the slot extending around a portion of the face and comprising a bottom surface. The protuberance of the cylindrical portion is configured to extend into the slot, and during rotation of the adjustment body from a first orientation to a second orientation, the protuberance and the slot cooperate to translate the adjustment body against resistance from the adjustable tensioning mechanism, and thereby adjust the tilt tension of the tiltable post.

Figure 2:
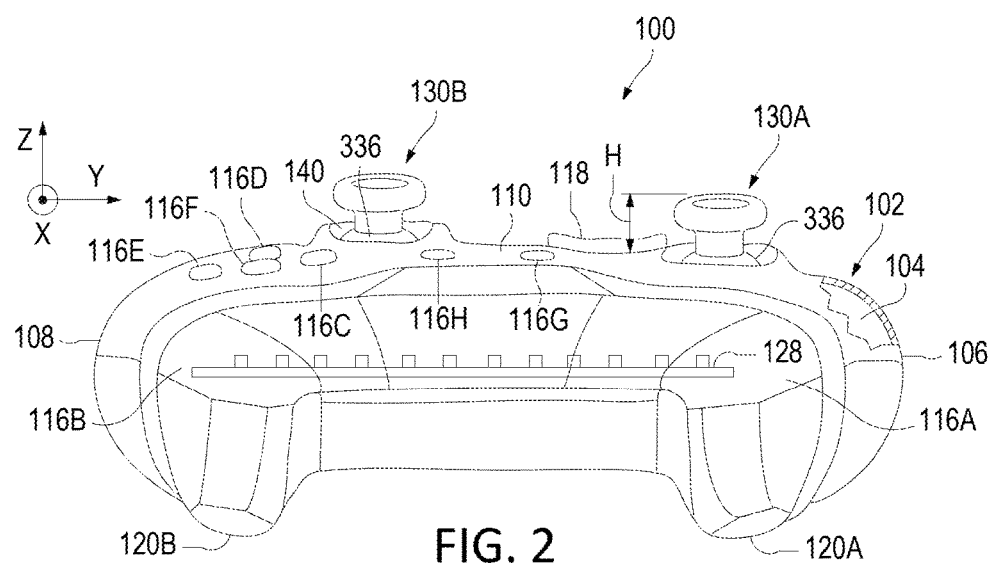
FIG. 2 shows a front end view of the game controller of FIG. 1 according to examples of the present disclosure.

FIGS. 1 and 2 show an example user input device in the form of a game controller 100. Game controller 100 is provided as an example of a user input device for purposes of illustration, and is not intended to be limiting. Other user input devices to which the present disclosure may apply (game controllers, air and land vehicle controllers, etc.) may have different shapes, different sizes, different numbers and/or placements of user interface features (thumbsticks, buttons, knobs, switches, triggers, pads, etc.), and/or other differences from game controller 100 shown in FIGS. 1 and 2.

The game controller 100 may be configured to translate user input into control signals that are provided to a computing device, such as a gaming console. For example, the game controller 100 may be configured to send control signals via a wired or wireless connection to a computing device. The control signals may be mapped to commands to control a video game or other program or application.

The game controller 100 includes a housing 102 that defines an internal chamber 104. The housing 102 is configured to be held by a user with two hands. As such, the housing 102 includes a left-hand portion 106 configured to be gripped by a left hand and a right-hand portion 108 configured to be gripped by a right hand. When a user holds the controller 100 with two hands such that the left hand grips the left-hand portion 106 and the right hand grips the right-hand portion 108, the user's thumbs may naturally interface with a thumb-side surface 110 of the housing 102.

The game controller 100 includes a plurality of controls configured to generate different control signals responsive to thumb and/or finger manipulation. The controls of game controller 100 include a plurality of action buttons 116 (e.g., 116A, 116B, 116C, 116D, 116E, 116F, 116G, and 116H), a directional pad 118, a left trigger 120A and a right trigger 120B. The game controller 100 may include any suitable number and type of controls.

In this example implementation and as described in more detail below, the controls include a left thumbstick 130A and a right thumbstick 130B that may be manipulated by a user's thumbs. Each of the thumbsticks 130A and 130B may comprise a joystick assembly (not shown in FIGS. 1 and 2) that is located at least partially in the internal chamber 104 of the game controller 100. In the current example and as described in more detail below, thumbsticks 130A and 130B are configured to tilt from a default position when moved by a thumb (or finger) relative to a pivoting location within the internal chamber 104 of the controller.

In FIGS. 1 and 2, thumbsticks 130A and 130B are shown in a default position in which the thumbsticks extend vertically above the thumb-side surface 110 of the housing 102 in a centered, non-tilted position. When tilted (e.g., pushed sideways in a y-axis direction and/or forward/back in an x-axis direction) by a thumb or finger of a user, thumbsticks 130A and 130B may tilt in any direction from center, and may be tilted by any degree/angle of tilt until a stop angle is reached. Tilting one or more of thumbsticks 130A and 130B may transmit input signals causing an action in a game, such as a particular motion of a character, an operation in a remotely-controlled device (e.g., increasing a propeller speed in a drone), and/or other action or response in another device or program.

As described in more detail below, in some examples a thumbstick may comprise an adjustable tensioning mechanism that provides and adjusts a tilt tension of the thumbstick. For example, a thumbstick such as one or both of thumbsticks 130A and 130B may utilize an adjustable tensioning mechanism that comprises a spring that maintains the thumbstick in a default, centered, non-tilted position. The spring may be compressed when the thumbstick is tilted from the default position, and may thereby provide a resistance or "tilt tension" that is felt by the user's thumb or finger. Such tilt tension may comprise a return force that urges the thumbstick back towards its default position.

In examples described herein, the thumbstick may comprise components that are configured to change the compression of the spring. The greater the amount of compression of the spring, the greater the tilt tension and resistance to tilting of the thumbstick. The lesser the amount of compression of the spring, the lesser the tilt tension and resistance to tilting of the thumbstick.

In examples described herein, the thumbstick tilt tension may be adjusted by a user gripping a thumbstick cap between the user's thumb and finger and rotating the cap to increase or decrease the tilt tension. In these examples, the user may conveniently adjust the tilt tension without disassembling the thumbstick assembly and without using a separate tool. In other examples, a tool may be used to engage an adjustment body to adjust the tilt tension. In other examples, the thumbstick cap may be removed and an adjustment body may be rotated directly by the user's thumb/finger. As described in more detail below, the tilt tension may be adjusted via an adjustable tensioning mechanism. The adjustable tensioning mechanism may be incorporated in the thumbstick or otherwise attached or coupled to the thumbstick in another manner.

In some examples, an adjustable tensioning mechanism may comprise a movable pin that protrudes from tiltable post, such that when the pin is moved vertically (along the post axis), the tilt tension of the thumbstick is adjusted. In some examples, such movement of the movable pin adjusts the compression of a compression spring to thereby adjust the tilt tension. In other examples, other load-creating components may additionally or alternatively be utilized. For example, a compressive member may be inserted between a switch body and the thumbstick cap such that a mechanism within the cap modifies the compression of the compressive member, thereby increasing or decreasing tilt tension.

Thumbsticks 130A and 130B may be manufactured from any suitable material(s), including plastic (e.g., injection molded), metal or combination of metals/alloys, etc. Housing 102 may be a single piece case or housing, or a case or housing formed of two more pieces (e.g., top and bottom portions). Housing 102 may be made from any suitable material(s), including plastic (e.g., injection molded), metal or combination of metals/alloys, etc. As described in more detail below, housing 102 may include mechanical and electrical components (e.g., a joystick assembly containing sensors) that measure the degree of tilt of thumbsticks 130A and 130B, and transmit an indication of the measure of tilt (e.g., to one or more processors contained in game controller 100 and/or in a remote component).

In the example of FIG. 1, game controller 100 includes a printed circuit board 128 located in the internal chamber 104 of the housing 102. The printed circuit board 128 may include a plurality of control-activation sensors that may correspond to the plurality of controls. In particular, each control-activation sensor may be configured to generate a control signal responsive to interaction with a corresponding control. The game controller 100 may include any suitable number and type of control-activation sensors. In some implementations, one or more control-activation sensors may be independent of any printed circuit board.

In some examples and as described in more detail below, each of the thumbsticks 130A and 130B may interact with thumbstick-activation sensors in the form of potentiometers that use continuous electrical activity to provide an analog input control signal based on a position of the thumbstick in relative to its default position. Non-limiting examples of control-activation sensors may include dome switches, tactile switches, potentiometers, Hall Effect sensors, and other electronic sensing components.

Figure 3:
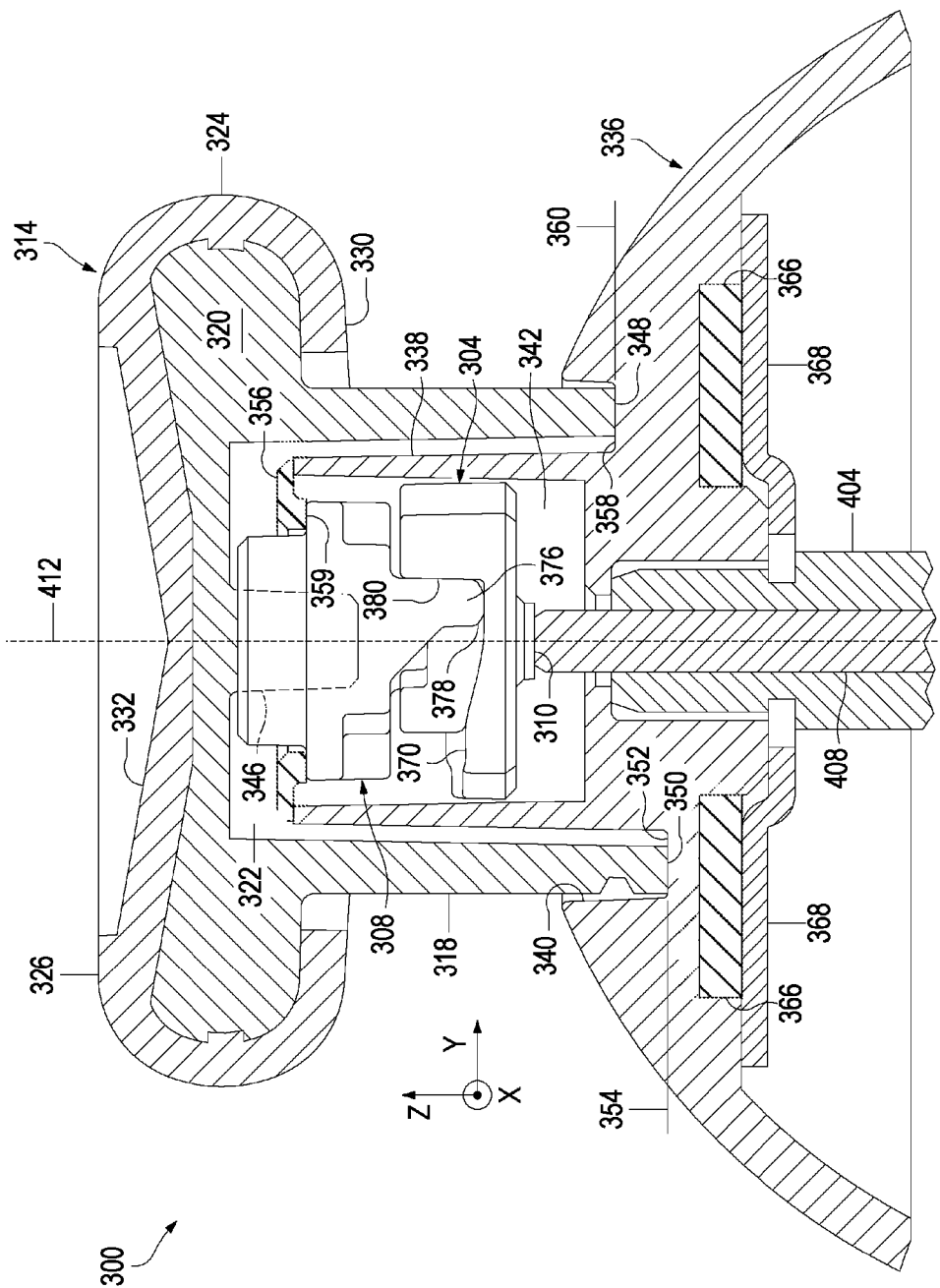
FIG. 3 shows a cross section view of a thumbstick according to examples of the present disclosure.

With reference now to FIGS. 3-11, a thumbstick 300 according to examples of the present disclosure will now be described. Thumbsticks 130A and 130B of game controller 100 may take the form of thumbstick 300. FIG. 3 shows a cross-sectional view of a portion of thumbstick 300 that comprises an engagement body 304 and an adjustment body 308 configured to adjust a tilt tension of the thumbstick.

Figure 4:
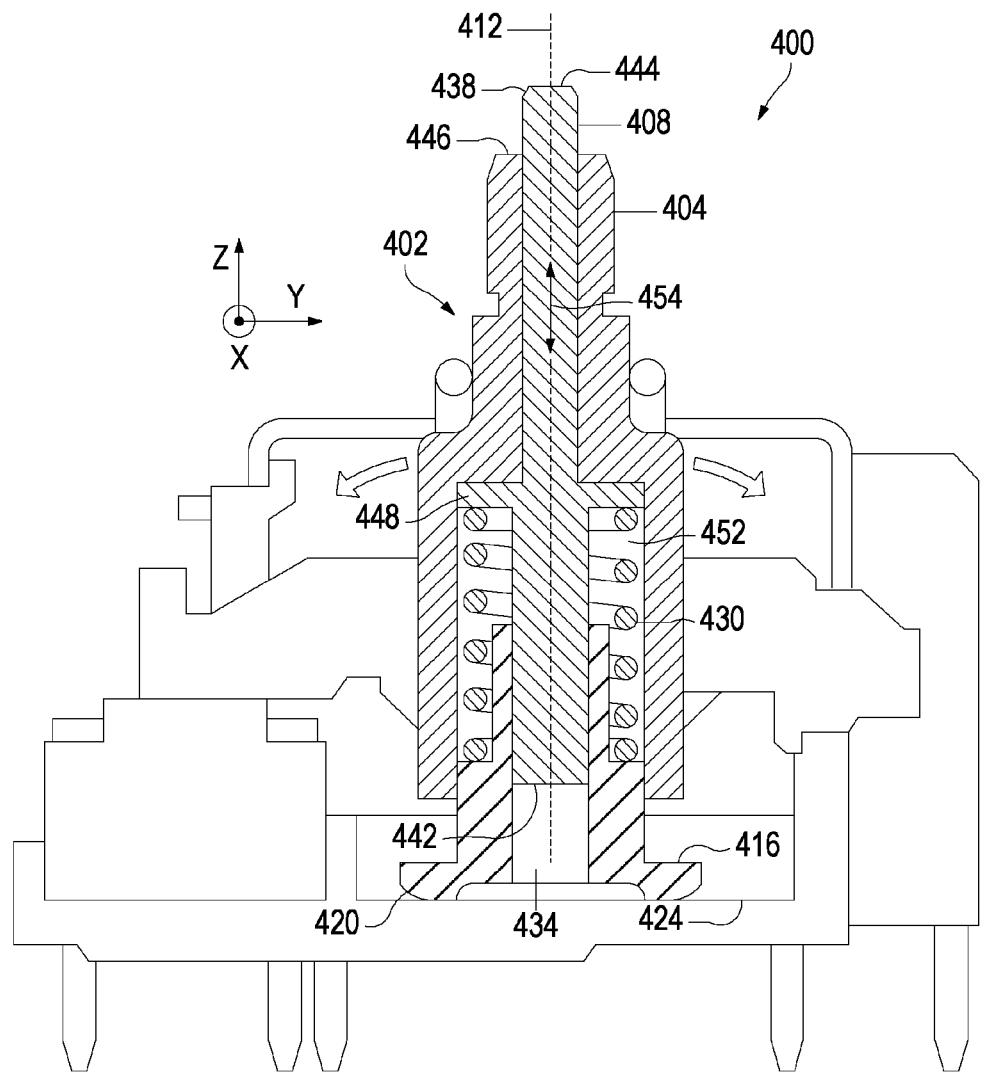
FIG. 4 shows a cross section view of an adjustable tensioning mechanism of a thumbstick according to examples of the present disclosure.

FIG. 4 shows a cross sectional view of a joystick assembly 400 of thumbstick 300. The joystick assembly 400 is an electronic component that may be mounted on printed circuit board 128 disposed within the housing 102 of game controller 100. The joystick assembly 400 comprises an adjustable tensioning mechanism 402 that is configured to adjust the tilt tension of a tiltable post 404. As described in more detail below, a movable pin 408 may translate within an opening and along an axis 412 of the tiltable post 404.

Tiltable post 404 includes a base portion 416 having a rounded disk shaped bottom portion 420 (e.g., curved at the edges, relatively flat at center) that is a pivot surface for the tilting of tiltable post 404 in any of three hundred and sixty (360) degrees from a default "center" position shown in FIG. 4. To provide a centering force that urges the tiltable post 404 back towards its default position, the bottom portion 420 of tiltable post 404 pushes against a bottom plate 424 under the load of compression spring 430.

Joystick assembly 400 includes a plurality of sensors in the form of potentiometers and/or other position detectors (e.g., Hall effect sensors, mechanical switches, optical sensors). The position sensors may utilize continuous electrical activity, or other mechanisms, to generate an analog input control signal based on a position of tiltable post 404 in relation to its default "center" position. For example, Joystick assembly may comprise one or more magnets and one or more Hall effect sensors configured to vary an output signal based on the magnetic field produced by the magnet(s). The magnetic field as detected by the Hall effect sensor may vary based on the relative position and/or orientation of the magnet and the sensor.

With continued reference to FIG. 4, pin 408 is configured to adjust the tilt tension of the thumbstick. Pin 408 resides in a post opening 434 that extends through the post 404 along axis 412 of the post. Pin 408 has a first end 438 and an opposing second end 442. With reference also to FIG. 3 and as described in more detail below, the first end 438 of pin 408 includes an engagement surface 444 that is contacted by a contacting surface 310 of the engagement body 304. In the example of FIG. 4, pin 408 includes a flange 448 (similar to a washer) that extends around at least a portion of a circumference of the pin between first end 438 and second end 442.

Compression spring 430 coils around the circumference of pin 408 inside a chamber 452 located within tiltable post 404. Spring 430 may be compressed between flange 448 and a surface of bottom portion 420 (e.g., a top ledge of bottom portion 420) of the tiltable post 404. Pin 408 is movable along post axis 412 (as indicated by arrow 454) through the post opening 434. In the illustrated example, pin 408 is movable from a first position (e.g., the position shown in FIG. 4 which is an uppermost position in chamber 452 where flange 448 contacts an upper surface of the chamber) to one or more positions in which the second end 442 is closer to bottom plate 424. Pin 408 moves against resistance provided by spring 430 to modify the tilt tension of post 404 to an amount dictated by the amount of compression of spring 430.

In some implementations, flange 448 may be located at second end 442 of pin 408. In some of these implementations, spring 430 may coil beneath pin 408 rather than around pin 408. In some implementations, pin 408 may not have a flange 448, but instead spring 430 may be compressed between the second end 442 of the pin and the plate 424. In general, pin 408 may take any suitable elongated form that serves to compress spring 430. Spring 430 and pin 408 may each be made of any suitable material, such as a metal (e.g., aluminum, steel) or metal alloy, a plastic, a resin, or other material.

With reference now to FIGS. 3 and 5, thumbstick 300 includes a cap 314 comprising a hollow cylindrical stem 318 extending from a generally disc-shaped body portion 320. With reference to thumbstick 130B in FIG. 2, the cap 314 and stem 318 may be positioned to extend above the thumb-side surface 110 of the housing 102, such as via aperture 140 in the thumb-side surface. As best seen in FIG. 3, the cylindrical stem 318 defines an internal cavity 322. A grip layer 324 comprising a top surface 326 and an opposing bottom surface 330 may be provided over body portion 320 of cap 314 to facilitate manipulation by a user's thumb and/or finger. The top surface 326 is designed to be manipulated by a user's thumb (or finger) and in this example includes a central concave portion 332, although top surface 326 may take any suitable form including convex or flat. Grip layer 324 may be formed from an elastomeric material or any other material that provides a measure of frictional contact with a user's thumb and fingers.

With reference also to FIG. 6, the thumbstick 300 includes a dome-shaped base 336 to which the cylindrical stem 318 of the cap 314 may be rotatably coupled as described below. The base 336 is coupled to and movable with the tiltable post 404 of the adjustable tensioning mechanism 402. In this manner, when the cap 314 and stem 318 are tilted via manipulation by a user's thumb or finger, the base 336 and tiltable post 404 are correspondingly tilted. As noted above, by causing post 404 to deviate from its default centered position, a two-dimensional analog input control signal is generated.

Dome-shaped base 336 includes a hollow cylindrical portion 338 extending upwardly in a z-axis direction into the cavity 322 of the cap 314. In this example the cylindrical portion 338 defines another cavity 342 (within the cavity 322 of the cap 314) in which the engagement body 304 and adjustment body 308 are located. In some examples the base 336 and cylindrical portion 338 may be formed as a single piece (e.g., by plastic injection molding). In other examples the base 336 and cylindrical portion 338 may be separate pieces that are joined together.

The base 336 includes a ring-shaped groove 340 encircling an upper portion of the base. With reference also to FIG. 6, the circular end 344 of the stem 318 is configured to extend into the groove 340 such that the cap 314 is rotatably mounted with respect to the base 336. In this example, the ring-shaped groove 340 comprises a plurality of alternating ridges 348 and valleys 350, wherein each of the plurality of valleys comprises a bottom-most surface 352 (shown in FIG. 3) that is in a first common plane 354 with the other bottom-most surfaces of the other valleys of the groove. Similarly, each of the plurality of ridges 348 comprises an upper-most surface 358 that is in a second common plane 360 with the other upper-most surfaces of the other ridges of the groove 340.

With reference again to FIG. 6, the circular end 344 of the stem 318 includes a plurality of mating alternating ridges 362 and valleys 364 that are configured to mate with the plurality of alternating ridges 348 and valleys 350 of the ring-shaped groove 340. In the example of FIG. 6, the circular end 344 of stem 318 has 5 equally spaced mating ridges 362 (3 of which are at least partially visible) that are configured to mate with 5 equally spaced corresponding valleys 350 in the groove 340. Correspondingly, the circular end 344 includes 5 equally spaced mating valleys 364 that are configured to mate with 5 equally spaced corresponding ridges 348 in the groove 340. In other examples, the circular end 344 and ring-shaped groove 340 may include any suitable number of ridges and valleys. In some examples, the number of ridges and valleys on circular end 344 may be different than the number of ridges and valleys on ring-shaped groove 340. For example, circular end 344 may have 5 ridges and 5 valleys and ring-shaped groove 340 may have 10 ridges and 10 valleys.

In some examples the stem 318 of cap 314 may be movably retained in the ring-shaped groove 340 via magnetic attraction. With reference to FIGS. 3 and 6, in one example the cylindrical stem 318 may be made at least partially of ferromagnetic material. A ring-shaped magnet 366 may be mounted to a support washer 368 in joystick assembly 400. As best seen in FIG. 3, with the joystick assembly 400 coupled to the dome-shaped base 336, the magnet 366 is located below the ring-shaped groove 340. With this configuration, magnet 366 attracts the ferromagnetic material of the stem 318 to thereby urge the circular end 344 of the stem into the ring-shaped groove 340.

As described in more detail below, a user may manipulate and rotate the cap 314 and cylindrical stem 318 relative to the dome-shaped base 336 via thumb/finger manipulation to cause the plurality of mating ridges 362 and valleys 364 of the stem to move relative to the plurality of alternating ridges 348 and valleys 350 of the ring-shaped groove 340, and thereby adjust the tilt tension of the thumbstick 300. For example, a user may rotate the cap 314 from a first orientation corresponding to a first tilt tension, such as the orientation shown in FIG. 6, to a second orientation corresponding to a second, different tilt tension. The magnetic attraction of the stem 318 into the groove 340 provided by magnet 366 may cause the cap 314 to seat in the second orientation.

In some examples as the cap 314 is rotated, the mating ridges 362 of stem 318 may slide along the surface of the groove 340 from corresponding bottom-most surfaces 352, over adjacent ridges 348 and upper-most surfaces 358, and down into adjacent bottom-most surfaces in the groove. In some examples, when the cap 314 is rotated to slide the mating ridges 362 over the ridges 348 of the groove 340 and into the valleys 350 of the groove, upon seating in such valleys contact between the mating ridges and the bottom-most surfaces 352 may generate tactile feedback indicating a selected tension setting. As noted above, the magnetic force provided by magnet 366 may operate to seat or snap the mating ridges 362 into the bottom-most surfaces 352 of the valleys 350 in the groove 340, thereby providing tactile and/or audible feedback indicating a particular tension setting.

In other examples and prior to or while rotating, a user may lift the cap 314 in the z-axis direction to partially or completely elevate the mating ridges 362 of stem 318 above the ridges 348 of groove 340. The user may then rotate the cap 314 to adjust the tilt tension of the thumbstick 300 and reseat the cap in a different tension setting.

The cap 314 includes a key portion 346 (shown in dotted line in FIG. 3) that extends downwardly in a z-axis direction into a mating keyhole 351 (shown in FIG. 7) in the adjustment body 308. In this manner and as described in more detail below, rotation of the cap 314 causes a corresponding rotation of the adjustment body 308, which in turn causes a translation of the engagement body 304 to adjust the tilt tension of the thumbstick. As the cap 314 is rotated and mating ridges 362 of stem 318 ride up and over corresponding ridges 348 in the groove 340, the cap 314 correspondingly moves vertically in the z-axis direction relative to the base 336 and adjustment body 308. In a similar manner, the key portion 346 moves relative to the mating keyhole 351 while maintaining contact with the keyhole to rotate the adjustment body 308. In this example, key portion 346 of cap 314 and keyhole 351 are keyed such that key portion 346 can only be inserted into keyhole 351 in one orientation. In other examples, key portion 346 and/or keyhole 351 may have rotation symmetry such that key portion 346 can be inserted into keyhole 351 in two or more orientations. In some examples, keyhole 351 may be of suitable shape to receive and be rotated by a tool such as a flat blade or Phillips screwdriver or a hex drive.

In other examples and as noted above, the cap 314 may be removable and the adjustment body 308 may be rotated directly by the user's thumb/finger to adjust the tilt tension of the thumbstick. For example and with reference to FIG. 3, the cap 314 may be removed and a user may grip and rotate the adjustment body 308 at a portion extending above retainer ring 356. In some examples, the adjustment body 308 may extend further above the retainer ring 356 to facilitate gripping by a user, and/or may include an upper grippable surface, such as a circular knob.

In other examples, the cap 314 may include an aperture centered on axis 412 through which a user may insert a tool that engages with adjustment body 308, such as by mating with keyhole 351, and may be used to rotate the adjustment body.

Operation of the adjustment body 308 and the engagement body 304 with the adjustable tensioning mechanism 402 according to examples will now be described. As shown in FIG. 3, a contacting surface 310 of the engagement body 304 contacts engagement surface 444 of the movable pin 408. The engagement body 304 includes at least one cam surface 370 disposed around the axis 412 of the tiltable post 404. With reference also to FIGS. 6 and 7, the engagement body 304 is slidably retained within the cavity 342 of the cylindrical portion 338 of base 336 and configured for translation along the z-axis. In this example, opposing tongues 372 and 373 of engagement body 304 are slidably received in corresponding grooves 374 in the cylindrical portion 338 of base 336. Accordingly, in this example the engagement body 304 is configured to translate without rotating along the z-axis and the axis 412 of post 404.

The cam surface 370 comprises a plurality of sloping portions that each slope upwardly in a z-axis direction. As described in more detail below, a follower 376 of the adjustment body 308 is configured to contact the sloping portions of the cam surface 370 and to rotate in a fixed plane perpendicular to the axis 412 of post 404. In this manner, as the cap 314 is rotated the follower 376 traverses the sloping portions and translates the engagement body 304 along the axis 412 of the tiltable post 404.

The adjustment body 308 is positioned at least partially in the cavity 342 of the cylindrical portion 338 of base 336 above the engagement body 304. The adjustment body 308 is configured to rotate in a plane perpendicular to the axis 412 of the tiltable post 404 without translating along the axis. The adjustment body 308 comprises follower 376 that extends downwardly to a distal end 378 which contacts the cam surface 370 of the engagement body 304.

With reference to FIGS. 3, 8, and 9, the thumbstick 300 is shown in a minimum-tension setting in which the follower 376 abuts a minimum-tension stop surface 380 of the engagement body 304. With this configuration, the minimum-tension stop surface 380 prevents rotation of the adjustment body 308 in a decreasing-tension direction (e.g., counter-clockwise in FIG. 9) when the adjustment body is in such minimum-tension orientation. With reference to FIGS. 12 and 13, the thumbstick 300 is shown in a maximum-tension setting in which the follower 376 abuts a maximum-tension stop surface 381 of the engagement body 304. In this example, the maximum-tension stop surface 381 is a vertical face (similar to minimum-tension stop surface 380) that prevents rotation of the adjustment body 308 in an increasing-tension direction (e.g., clockwise in FIG. 13) when the adjustment body is in such maximum tension orientation. In other embodiments, maximum-tension stop surface 381 may be an angled face to allow adjustment body 308 to rotate directly from a maximum tension orientation to a minimum tension orientation without passing through any intermediate tension settings by traveling in an increasing tension direction.

With reference again to FIGS. 3 and 4, movable pin 408 is urged upwardly by compression spring 430 to thereby oppose the downward movement of engagement body 304. In this manner, the adjustment body 308 is biased upwardly and is retained in the cavity 342 by a retainer ring 356. With reference also to FIG. 7, as the adjustment body 308 is rotated, a retaining surface 357 of the adjustment body slides along a bottom portion 359 of the retainer ring 356.

With reference to FIGS. 8-13 and as described in more detail below, the follower 376 is configured to traverse around the cam surface 370 when the cap 314 is rotated, and thereby translate the engagement body 304 along the axis 412 of the tiltable post 404 and adjust the tilt tension of the tiltable post. Advantageously, this configuration enables a user to easily and conveniently increase or decrease the tilt tension of thumb stick 300 by turning the cap 314. Additionally and with reference also to FIG. 2, a user may adjust thumbstick 300/130A/130B to a plurality of tilt tension settings without changing a height of the thumbstick relative to the thumb-side surface 110 of the game controller housing 102. In other words, a height of the cap 314 above the surface of a user input device at the first tilt tension is equal to the height of the cap above the surface of the user input device at a second tilt tension.

For example and as illustrated in FIG. 2, at a first tilt tension setting thumbstick 130A may have a height H above the thumb-side surface 110 of housing 102. A user may then rotate the cap of thumbstick 130A to increase or decrease the tilt tension applied to the thumbstick. After the tilt tension has been changed, thumbstick 130A continues to have the same height H above the thumb-side surface 110 of housing 102. Advantageously, in this manner a user may adjust the tilt tension of the thumbstick 130A without changing its height relative to the game controller 100. Accordingly, when engaging with the thumbstick 130A, the position of the user's thumb relative to the game controller 100 may remain consistent across various tilt tensions.

In some examples, the adjustment body 308 may include a single follower that engages with a single cam surface of the engagement body. In other examples the adjustment body 308 may include a plurality of followers that engage with a corresponding plurality of cam surfaces of the engagement body. For example and as illustrated in FIGS. 6-13, the cam surface 370 may be an outer cam surface located around a periphery of the engagement body 304, and the follower 376 may be an outer follower located at an outer periphery of the adjustment body 308. In this example and with reference to FIGS. 6 and 7, the engagement body 304 further comprises an inner cam surface 382 that is also disposed around the axis 412 of the tiltable post 404, and is positioned between the axis of the tiltable post and the outer cam surface 370. Similarly, the adjustment body 308 further comprises an inner follower 384 configured to traverse the inner cam surface 382 when the cap 314 is rotated.

As noted above, outer cam surface 370 includes a plurality of sloping portions. In the example of FIGS. 6-13 and as best seen in FIG. 11, outer cam surface 370 has 3 sloping portions 385, 386, and 387 between the minimum-tension stop surface 380 and the maximum tension stop surface 381. In other examples, any suitable number of sloping portions may be utilized. In the present example and as described in more detail below, the outer cam surface 370 also comprises a plurality of flat portions located either between 2 sloping portions or adjacent to one sloping portion, with each of the flat portions corresponding to a different tilt tension of the tiltable post.

Similarly, inner cam surface 382 has 3 sloping portions 388, 389, and 390 between the inner minimum-tension stop surface 391 and the inner maximum tension stop surface 392. In this example, the number and radial location of the sloping portions 388, 389, and 390 of the inner cam surface 382 match the number and radial location of the sloping portions 385, 386, and 387 of the outer cam surface 370. The inner cam surface 382 also comprises a plurality of flat portions located either between 2 sloping portions or adjacent to one sloping portion, with each of the flat portions corresponding to a different tilt tension of the tiltable post. The number and radial location of the inner cam surface flat portions match the number and radial location of the outer cam surface flat portions.

With reference to FIGS. 7, 8 and 9, a first flat portion 393 of the outer cam surface 370 is located adjacent to the minimum-tension stop surface 380 of the outer cam surface. Similarly, a first flat portion 394 of the inner cam surface 382 is located adjacent to the minimum-tension stop surface 391 of the inner cam surface. FIGS. 8 and 9 illustrate the adjustment body 308 in a minimum-tension orientation in which the outer distal end 378 of outer follower 376 contacts the outer cam surface 370 at an outer contact point located at the first flat portion 393 of the outer cam surface, and the inner distal end 383 of inner follower 384 contacts the inner cam surface 382 at an inner contact point located at the first flat portion 394 of the inner cam surface.

As shown in FIG. 9, in this example the outer follower 376 and inner follower 384 contact their respective cam surfaces at locations that are 180 degrees opposed to one another relative to the axis 412 of the tiltable post 404. In this manner, the opposing followers provide stability as the adjustment body 308 is rotated and the followers engage with their respective cam surfaces to translate the engagement body 304. Further, during rotation of the cap 314 and corresponding rotation of adjustment body 308, the outer contact point and the inner contact point of the outer follower 376 and inner follower 384, respectively, remain at a constant location along the axis 412 of the tiltable post 404 during such rotation. In other words, the outer distal end 378 of outer follower 376 and the inner distal end 383 of the inner follower 384 contact their respective cam surfaces at the same z-axis location along the axis 412 throughout such rotation. In this manner, this example configuration may provide additional stability to the adjustment body 308 and engagement body 304 during adjustment of the tilt tension. In some examples, the inner cam surface 382 and the outer cam surface 370 also may have the same radial length such that they traverse the same radial distance around the axis 412 of the tiltable post 404.

As shown in FIG. 8, with the adjustment body 308 in the minimum-tension orientation, a height of a bottom surface 309 above a top surface 446 of the tiltable post 404 is a minimum-tension height TH1. Such minimum-tension height corresponds to a minimum-tension compression of the spring 430, and to a minimum tilt tension setting of the thumbstick 300. As the cap 314 is rotated in an increasing-tension direction (clockwise in FIG. 9), the outer follower 376 and inner follower 384 cooperate with the outer cam surface 370 and inner cam surface 382, respectively, to translate the engagement body 304 downwardly in the z-axis direction to further compress spring 430 and thereby increase the tilt tension of the thumbstick 300.

FIGS. 10 and 11 illustrate the adjustment body 308 in another tension orientation/tilt tension setting providing a greater tilt tension than the minimum tilt tension setting. In this orientation, outer follower 376 is located at a flat portion of the outer cam surface 370 that is between sloping portion 385 and sloping portion 386 of the outer cam surface. Similarly, inner follower 384 is located at a flat portion of the inner cam surface 382 that is between sloping portion 388 and sloping portion 389 of the inner cam surface. As shown in FIG. 10, in this orientation the height of the bottom surface 309 of engagement body 304 above the top surface 446 of the tiltable post 404 is a first intermediate-tension height TH2. Such first intermediate-tension height corresponds to a first intermediate tilt tension setting of the thumbstick 300 that is greater than the minimum tilt tension setting.

With reference also to FIG. 6, in some examples the orientation of the cap 314 and its cylindrical stem 318 relative to the dome-shaped base 336 may correspond to different tilt tension settings. For example, the cylindrical stem 318 of cap 314 and the ring-shaped groove 340 of base 336 may be in a first orientation relative to one another, with the mating ridges 362 of the stem seated in corresponding valleys 350 of the groove. In this first orientation, the outer follower 376 of the adjustment body 308 may be positioned at the first flat portion 393 of the outer cam surface 370. The inner follower 384 may be positioned at the first flat portion 394 of the inner cam surface 382. In other words, the adjustment body 308 and engagement body 304 may be oriented in the minimum-tension setting as illustrated in FIGS. 8 and 9.

As a user rotates the cap 314 clockwise from this first orientation, the mating ridges 362 slide up and over the adjacent ridges 348 of the groove 340 until the mating ridges slide into adjacent valleys 350 in the groove. After such rotation, the cylindrical stem 318 and ring-shaped groove 340 are in a second orientation. In some examples this second orientation may correspond to the first intermediate-tension setting as illustrated in FIGS. 10 and 11, in which the outer follower 376 is positioned at the next adjacent flat portion of outer the cam surface 370, and the inner follower 384 is positioned at the next adjacent flat portion of the inner cam surface 382.

In this example, a user may conveniently increase and decrease the tilt tension of the thumbstick among different discrete tension settings. Further, this configuration may provide tactile feedback to the user indicating an arrival at each tilt tension setting as described above.

FIGS. 12 and 13 illustrate the adjustment body 308 in a maximum-tension orientation/tilt tension setting providing a maximum tilt tension to the thumbstick 300. In this orientation, outer follower 376 is located at a flat portion of the outer cam surface 370 that is adjacent to the outer maximum tension stop surface 381. Similarly, inner follower 384 is located at a flat portion of the inner cam surface 382 that is adjacent to the inner maximum tension stop surface 392. As shown in FIG. 12, in this orientation the height of the bottom surface 309 of engagement body 304 above the top surface 446 of the tiltable post 404 is a maximum-tension height TH4. Such maximum-tension height corresponds to a maximum tilt tension setting of the thumbstick 300.

As noted above, in this configuration the outer cam surface 370 and the inner cam surface 382 may each have 3 sloping surfaces between their respective minimum-tension and maximum tension locations. Accordingly, this configuration may include a second intermediate-tension setting (not illustrated) between the first intermediate tension setting of FIGS. 10 and 11 and the maximum intermediate tension setting of FIGS. 12 and 13. At such second intermediate-tension setting, the outer follower 376 and inner follower 384 may be located at corresponding flat portions on the outer cam surface 370 and inner cam surface 382, respectively.

In some examples, between the minimum-tension setting of FIGS. 8 and 9 and the maximum tension setting of FIGS. 12 and 13, the engagement body 304 may translate a distance along the z-axis of between about 0.7 mm and 1.7 mm, or between about 1.0 mm and about 1.4 mm, or about 1.2 mm. In other examples, any suitable translation distance may be utilized.

As illustrated in FIGS. 8-13, a user may conveniently adjust the tilt tension of the thumbstick 300 from a minimum-tension setting to a maximum tension setting by rotating the cap 314 less than 360 degrees. In some examples, a radial distance between a minimum-tension setting and a maximum tension setting may be between about 240 degrees and 300 degrees, or about 260 degrees and 280 degrees, or about 270 degrees. In this manner, a user may conveniently and quickly adjust the tension of the thumbstick 300 between its minimum-tension setting and its maximum tension setting by turning the cap 314 less than one complete revolution.

As described above, by enabling a user to conveniently and easily adjust the tension of thumbstick 300 by simply turning cap 314 with the user's thumb and finger, examples of the present disclosure also may provide greater accessibility to differently-abled users who may, for example, have fewer or impaired fine motor skills In this manner, thumbsticks according to the present disclosure may be utilized by potential users having a broader range of physical capabilities.

Figure 14:
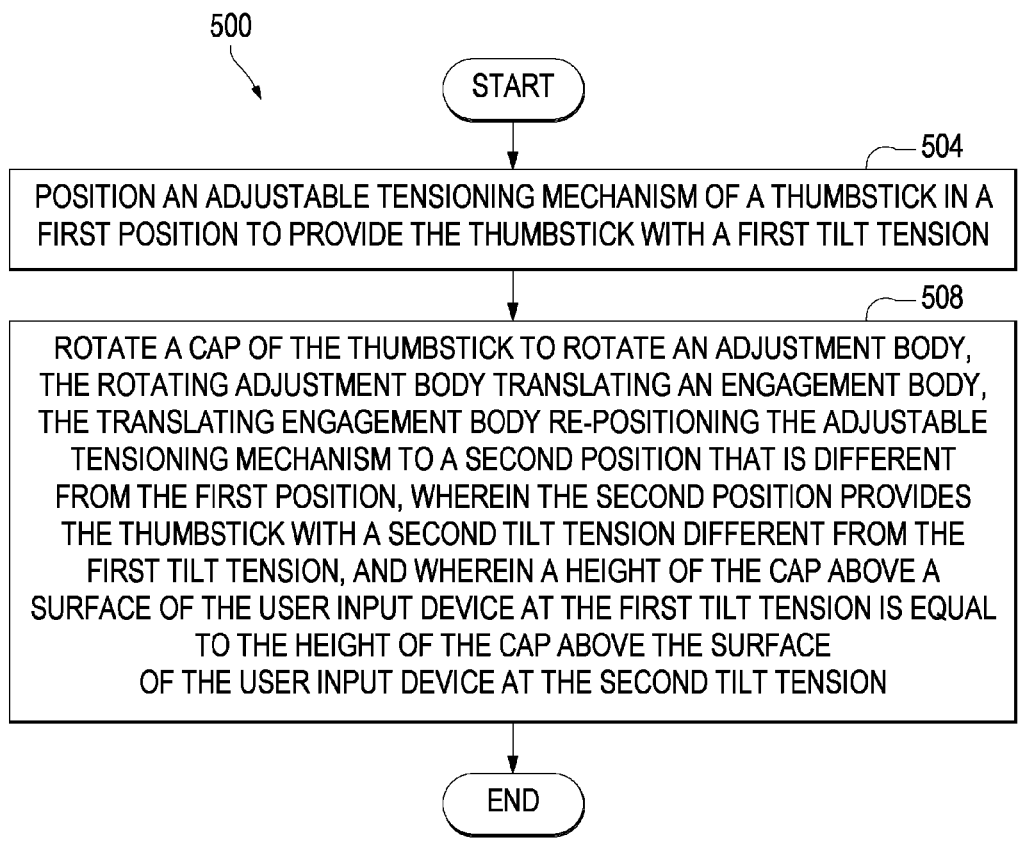
FIG. 14 shows a method for adjusting a tilt tension of a thumbstick of a user input device according to examples of the present disclosure.

FIG. 14 illustrates a flow chart of a method 500 for adjusting a tilt tension of a thumbstick of a user input device according to an example of the present disclosure. The following description of method 500 is provided with reference to the components and use case scenarios described above and shown in FIGS. 1-13. It will be appreciated that method 500 also may be performed in other contexts using other suitable components.

With reference to FIG. 14, at 504 the method 500 may include positioning an adjustable tensioning mechanism in a first position to provide the thumbstick with a first tilt tension. At 508 the method 500 may include rotating a cap of the thumbstick to rotate an adjustment body, the rotating adjustment body translating an engagement body, the translating engagement body re-positioning the adjustable tensioning mechanism to a second position that is different from the first position, wherein the second position provides the thumbstick with a second tilt tension different from the first tilt tension, and wherein a height of the cap above a surface of the user input device at the first tilt tension is equal to the height of the cap above the surface of the user input device at the second tilt tension.

It will be appreciated that method 500 is provided by way of example and is not meant to be limiting. Therefore, it is to be understood that method 500 may include additional and/or alternative steps relative to those illustrated in FIG. 14. Further, it is to be understood that method 500 may be performed in any suitable order. Further still, it is to be understood that one or more steps or portions of a step may be omitted from method 500 without departing from the scope of this disclosure.

Figure 15:
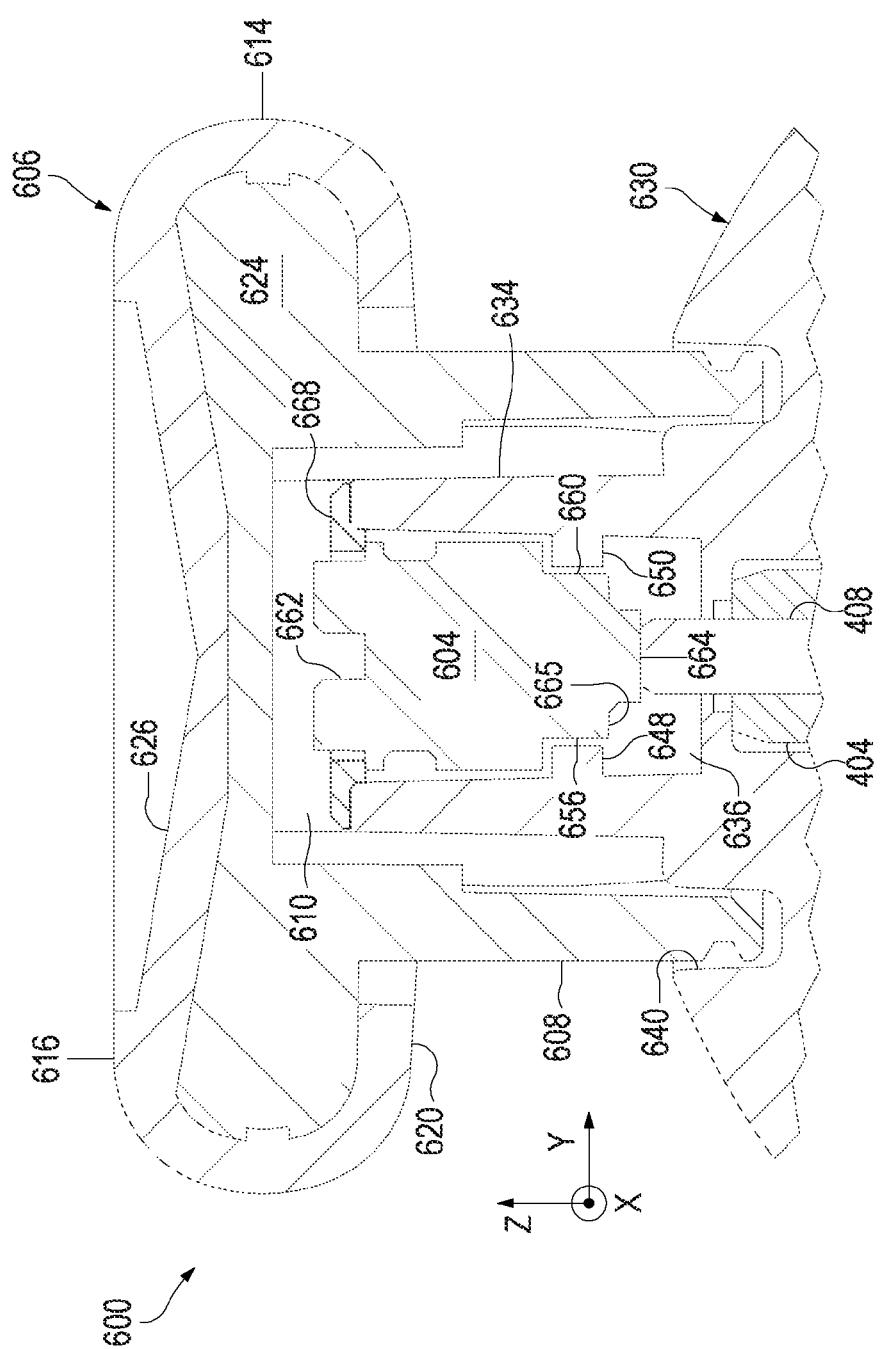
FIG. 15 shows a cross section view of a thumbstick according to examples of the present disclosure.

With reference now to FIGS. 15-23, in some examples a thumbstick 600 may comprise an adjustment body 604 that also engages the pin 408 of the adjustable tensioning mechanism 402 to adjust a tilt tension of the thumbstick. Thumbsticks 130A and 130B of game controller 100 shown in FIGS. 1 and 2 may take the form of thumbstick 600. FIG. 15 shows a cross-sectional view of a portion of thumbstick 600. In the example of FIG. 15, upper portions of pin 408 and tiltable post 404 of the joystick assembly 400 of FIG. 4 also are shown.

In this example, a cap 606 of thumbstick 600 comprises a hollow cylindrical stem 608 that defines a first cavity 610. With reference to thumbstick 130B in FIG. 2, the cap 606 and stem 608 may be positioned to extend above the thumb-side surface 110 of the housing 102, such as via aperture 140 in the thumb-side surface. A grip layer 614 comprising a top surface 616 and an opposing bottom surface 620 may be provided over body portion 624 of cap 606 to facilitate manipulation by a user's thumb and/or finger. The top surface 616 is designed to be manipulated by a user's thumb (or finger) and in this example includes a central concave portion 626, although top surface 616 may take any suitable form including convex or flat. Grip layer 614 may be formed from an elastomeric material or any other material that provides a measure of frictional contact with a user's thumb and fingers.

Figure 16:
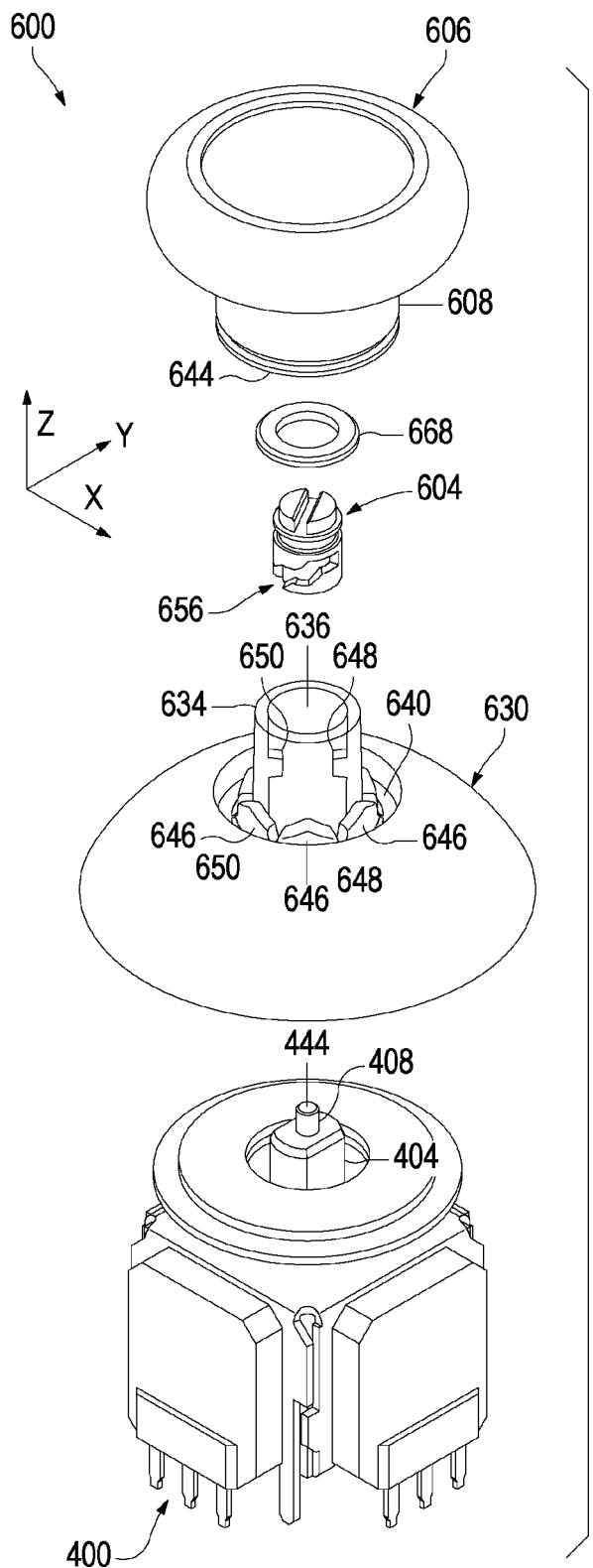
FIG. 16 is an exploded view of the thumbstick of FIG. 15 showing an adjustment body and a base including two protuberances according to examples of the present disclosure.

With reference also to FIG. 16, the thumbstick 600 includes a dome-shaped base 630 to which the cylindrical stem 608 of the cap 606 may be removably coupled. The base 630 is coupled to and movable with the tiltable post 404 of the adjustable tensioning mechanism 402 as described above. Dome-shaped base 630 includes a hollow cylindrical portion 634 extending upwardly in a z-axis direction into the first cavity 610 of the cap 606. In this example the cylindrical portion 634 defines a second cavity 636 (within the first cavity 610 of the cap 606) in which the adjustment body 604 is located. In some examples the base 630 and cylindrical portion 634 may be formed as a single piece (e.g., by plastic injection molding). In other examples the base 630 and cylindrical portion 634 may be separate pieces that are joined together.

The base 630 includes a ring-shaped groove 640 encircling an upper portion of the base. With reference also to FIG. 16, the circular end 644 of the stem 608 is configured to extend into the groove 640 such that the cap 608 is fixedly mounted with respect to the base 630. In this example and with reference also to FIG. 18, the ring-shaped groove 640 may comprise a plurality of wedges 646 encircling the cylindrical portion 634. In some examples, the stem 608 may be pressed over the wedges 646 to be secured within the groove 640 via an interference fit with the wedges. In other examples, any suitable method for affixing the stem 608 within groove 640 may be utilized.

As described in more detail below, the cylindrical portion 634 of base 630 includes at least one protuberance that extends laterally into the second cavity 636. The adjustment body 604 includes a corresponding slot recessed into a face of the adjustment body, with the slot extending around a portion of the face. The protuberance of the cylindrical portion 634 extends into the slot. In this manner, the slot is configured to engage the protuberance when the adjustment body 604 is rotated and translated from a first orientation to a second orientation to adjust the tilt tension of the tiltable post 404.

With reference now to FIGS. 15-18, in this example the cylindrical portion 634 comprises a first protuberance 648 and a second protuberance 650. In this example, the second protuberance 650 is located opposite to the first protuberance 648 along an interior surface 652 of the cylindrical portion 634. With reference also to FIG. 15, the first protuberance 648 and second protuberance 650 also may be located at the same height along the z-axis within the cylindrical portion 634.

The first protuberance 648 and second protuberance 650 also may have a matching shape. For example and with reference to FIG. 20, the first protuberance 648 (and second protuberance 650) may have a shape comprising opposing parallel side surfaces 649 and 651, a top surface 653 and a parallel bottom surface 654, and opposing inclined surfaces 655 and 657.

In this example the adjustment body 604 comprises a first slot 656 that is recessed into the face 658 of the adjustment body and extends around a portion of the face. As described in more detail below, during rotation of the adjustment body 604 the first protuberance 648 and the first slot 656 cooperate to translate the adjustment body against resistance from the adjustable tensioning mechanism (e.g., force exerted by spring 430), and thereby adjust the tilt tension of the tiltable post 404.

In this example the adjustment body 604 also comprises a second slot 660 that is recessed into the face 658 of the adjustment body and extends around another portion of the face. The first slot 656 and second slot 660 may have a matching shape, and may be located opposite to one another on the face 658 of the adjustment body 604. In other words, the first slot 656 and second slot 660 may be located 180 degrees from one another around the circumference of the adjustment body 604.

As described in more detail below, in this example and during rotation of the adjustment body 604, the first protuberance 648 cooperates with the first slot 656 and the second protuberance 650 cooperates with the second slot 660 to translate the adjustment body and thereby adjust the tilt tension of the tiltable post 404. In other examples, 3 or more slot/protuberance pairs may be utilized. For example, in another configuration 4 protuberances spaced 90 degrees from one another and 4 corresponding slots also spaced 90 degrees from one another may be utilized.

Operation of the adjustment body 604 with the adjustable tensioning mechanism 402 according to examples will now be described. In this example and with reference again to FIG. 15, the cap 606 may be removable by a user. In this manner, access may be granted to enable a user to rotate the adjustment body 604. In the example of FIG. 15, the adjustment body 604 includes a tool-receiving feature that comprises a slot 662 configured to receive the tip of a flat-blade screwdriver or other similar tool. In this manner and as described in more detail below, a user may engage and rotate the adjustment body 604 with a corresponding tool to adjust the tilt tension of the thumbstick 600. It will be appreciated that many other examples of tool-receiving features and corresponding tools, such as Phillips drives, hex drives, etc., may be utilized with the adjustment body 604.

In other examples, the adjustment body 604 may be rotated directly by the user's thumb/finger to adjust the tilt tension of the thumbstick. For example and with reference to FIG. 15, a user may grip and rotate the adjustment body 604 at a portion extending above retainer ring 668. In some examples, the adjustment body 604 may extend further above the retainer ring 668 to facilitate gripping by a user, and/or may include an upper grippable surface, such as a circular knob.

In other examples, the cap 606 may be fixedly attached to the base 630, and may include an aperture centered on axis 412 of the tiltable post 404 through which a user may insert a tool that engages with slot 662 to rotate the adjustment body 604.

In other examples, the cap 606 may be rotatably coupled to the base 630 in a manner similar to cap 314 in thumbstick 300 described above. In these examples the cap 606 may include a key portion that extends downwardly in a z-axis direction into mating slot 662 in the adjustment body 604. In this manner rotation of the cap 606 causes a corresponding rotation and translation of the adjustment body 604 to adjust the tilt tension of the thumbstick.

As shown in FIGS. 15 and 16, a contacting surface 664 at a distal end 665 of the adjustment body 604 contacts engagement surface 444 of the movable pin 408. The adjustment body 604 is moveably retained within the second cavity 636 of the cylindrical portion 634 of base 630, and is configured for both rotation about and translation along the axis 412 of the tiltable post 404.

FIGS. 15 and 21 shows the adjustment body 604 in a first, minimum-tension orientation that corresponds to a minimum tilt tension setting. In this orientation, spring 430 via the movable pin 408 urges the adjustment body 604 upwardly in the z-axis direction. An upper lip 666 of the adjustment body 604 contacts a retainer ring 668 affixed to an end of the cylindrical portion 634 to retain the adjustment body in the second cavity 636 at this orientation.

As noted above, the first protuberance 648 and second protuberance 650 may have a matching shape and may be located opposite one another in the cylindrical portion 634. Similarly, the first slot 656 and second slot 660 may have a matching shape and may be located opposite to one another on the face 658 of the adjustment body 604. Accordingly, in this example the following discussion of first slot 656 and first protuberance 648 applies equally to the second slot 660 and second protuberance 650.

Figure 17:
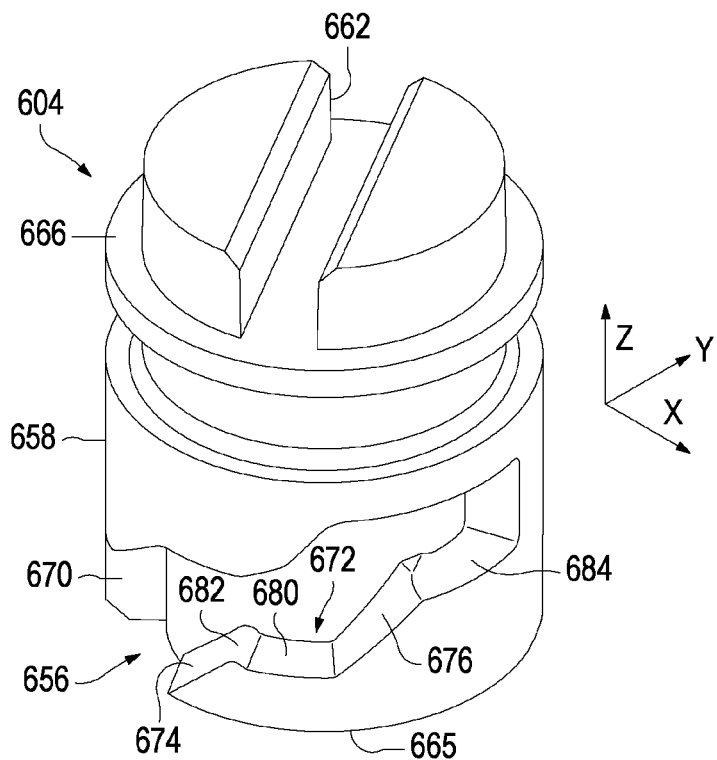
FIG. 17 shows a perspective view of the adjustment body of the thumbstick of FIG. 16 according to examples of the present disclosure.
Figure 18:
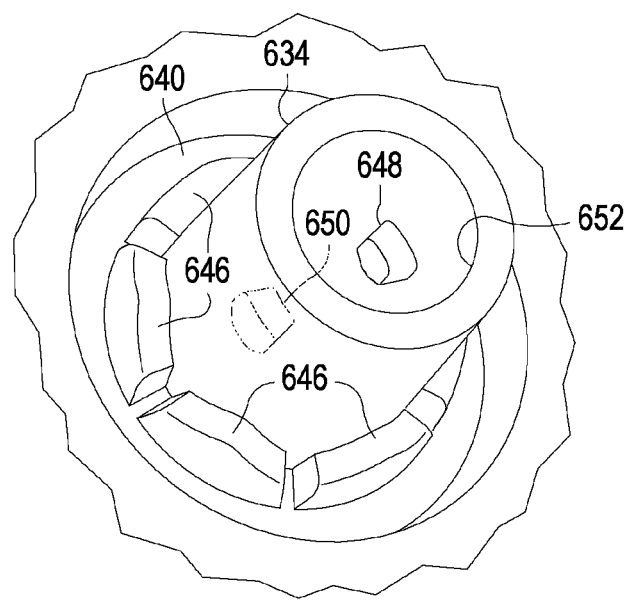
FIG. 18 shows a perspective view of the base and protuberances of the thumbstick of FIG. 16 according to examples of the present disclosure.

With reference to FIGS. 17, 19, and 21, the first slot 656 comprises a minimum-tension stop surface 670 configured to abut the side face 651 of the first protuberance 648 when the adjustment body 604 is in the minimum-tension orientation. In this manner, the minimum-tension stop surface 670 prevents rotation of the adjustment body 604 in a decreasing-tension direction (counter-clockwise in FIG. 21) to maintain a minimum tilt tension of the thumb stick 600.

As shown in FIGS. 17, 19 and 21-23, a bottom surface 672 of the first slot 656 comprises at least one ramping portion that is inclined away from the distal end 665 of the adjustment body 604. In this example, the bottom surface 672 includes a first ramping portion 674 and a second ramping portion 676. As described in more detail below, the ramping portions are configured to slide against the protuberance when the adjustment body 604 is rotated in an increasing-tension direction (clockwise in FIGS. 21-23 as indicated by arrow C) to thereby translate the adjustment body toward the tiltable post 404 and increase the tilt tension of the tiltable post 404.

With reference to FIG. 21, from this minimum-tension orientation when a user rotates the adjustment body 604 in an increasing-tension direction (clockwise), the first ramping portion 674 contacts and slides against the inclined surface 655 of the first protuberance. As the rotation continues, the adjustment body 604 is translated downwardly in a negative z-axis direction (along the axis 412 of tiltable post 404) toward the tiltable post to thereby further compress spring 430 and increase the tilt tension of the thumbstick 600.

The first ramping portion 674 of bottom surface 672 transitions to a first flat portion 680 of the bottom surface. As shown in FIG. 19, the first flat portion 680 is elevated in the z-axis direction as compared to the distal end 665 of the adjustment body 604. Accordingly and as shown in FIG. 22, the first flat portion 680 corresponds to an intermediate-tension orientation of the adjustment body 604 in which the first protuberance 648 is located at the first flat potion, and the tilt tension of the tiltable post 404 is greater than the minimum-tension orientation.

In this example and with reference to FIGS. 17, 19 and 21, the first ramping portion 674 transitions to the first flat portion 680 of the bottom surface 672 via a first hump 682. The uppermost surface of the first hump 682 is higher along the z-axis than the flat portion 680. Accordingly, upon the rotation of the adjustment body 604 from the minimum-tension orientation of FIG. 21 to the intermediate-tension orientation of FIG. 22, as the first protuberance 648 passes over the first hump 682, the force from the adjustable tensioning mechanism 402 (e.g., spring 430) seats the first protuberance on the first flat portion 680 of the bottom surface 672.

With this configuration, contact between the first protuberance 648 and the bottom surface 672 may generate tactile feedback, such as a click, tap or other touch-perceptible feedback, that may be felt by the user via the game controller 100. Such tactile feedback also may indicate a selected tilt tension. In this manner, this configuration enables a user to easily adjust, locate and set the tilt tension of the thumbstick 600 to an intermediate-tension setting.

In some examples, the bottom surface 672 of the first slot 656 may comprise a plurality of flat portions that each correspond to a different tilt tension of the tiltable post. In the present example, a second flat portion 684 may be located between the second ramping portion 676 and a maximum-tension stop surface 686. In this example the maximum-tension stop surface 686 is a vertical surface extending from an inner wall 687 of the first slot 656. The maximum-tension stop surface 686 is configured to abut the side face 649 of the first protuberance 648 when the adjustment body 604 is in the maximum-tension orientation shown in FIG. 23. In this manner, the maximum-tension stop surface 686 prevents rotation of the adjustment body 604 in an increasing-tension direction (clockwise in FIG. 23) to maintain a maximum tilt tension of the thumbstick 600.

As with the first ramping portion 674 and first hump 682, the second ramping portion 676 also may transition to the second flat portion 684 of the bottom surface 672 via a second hump 688 in a similar manner. In the maximum-tension orientation shown in FIG. 23, and with reference also to FIGS. 17 and 19, the second flat portion 684 is elevated as compared to the first flat portion 680. Accordingly in this maximum-tension orientation, the adjustment body 604 has been translated downwardly to be closer to the tiltable post 404 than in the intermediate-tension orientation of FIG. 22. It follows that the second flat portion 684 corresponds to a maximum-tension orientation of the adjustment body 604 in which the first protuberance 648 is located at the second flat potion, and the tilt tension of the tiltable post 404 is greater than the intermediate-tension orientation.

In some examples, between the minimum-tension orientation of FIG. 21 and the maximum tension setting of FIG. 23, the adjustment body 604 may translate a distance along the z-axis of between about 0.7 mm and 1.7 mm, or between about 1.0 mm and about 1.4 mm, or about 1.2 mm. In other examples, any suitable translation distance may be utilized.

Additionally and with reference also to FIG. 2, it will be appreciated that thumbstick 600/130A/130B enables a user to adjust the thumbstick to a plurality of tilt tension settings without changing a height of the thumbstick relative to the thumb-side surface 110 of the game controller housing 102. In other words, a height H of the thumbstick cap above the surface of a user input device at a first tilt tension is equal to the height H of the cap above the surface of the user input device at a second tilt tension.

Figure 24:
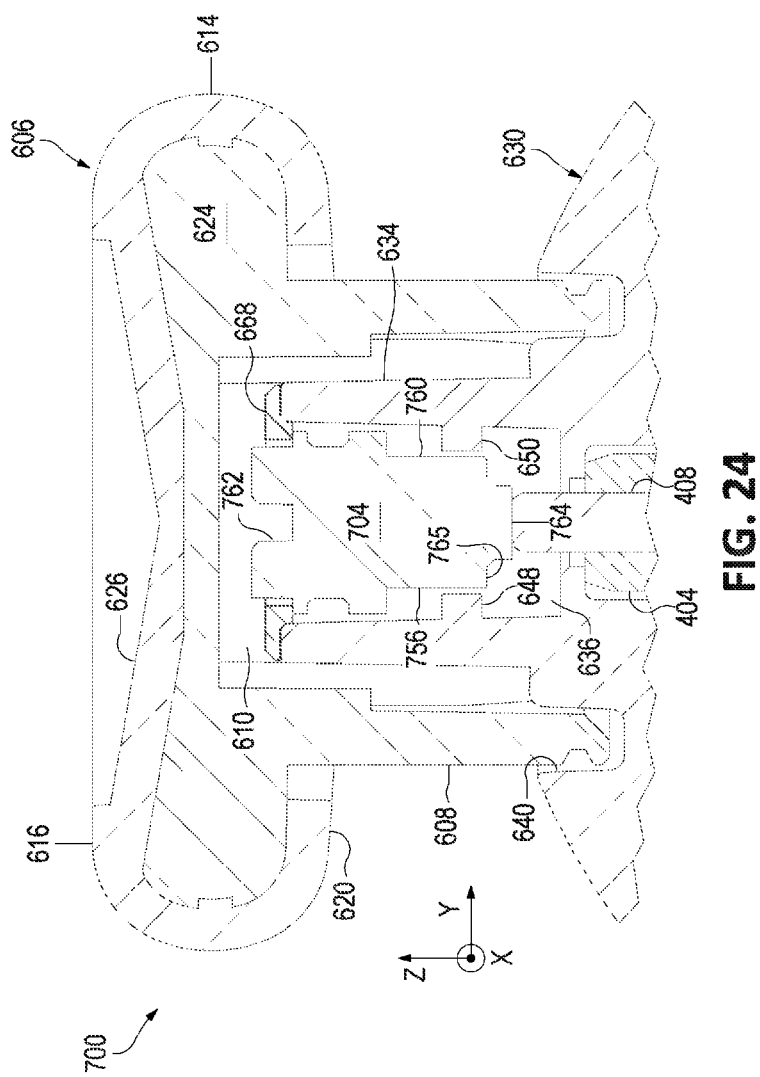
FIG. 24 shows a cross section view of a thumbstick according to examples of the present disclosure.

With reference now to FIGS. 24-31, in some examples a thumbstick 700 may comprise an adjustment body 704 that also engages the pin 408 of the adjustable tensioning mechanism 402 to adjust a tilt tension of the thumbstick. Thumbsticks 130A and 130B of game controller 100 shown in FIGS. 1 and 2 may take the form of thumbstick 700. FIG. 24 shows a cross-sectional view of a portion of thumbstick 700. In the example of FIG. 24, upper portions of pin 408 and tiltable post 404 of the joystick assembly 400 of FIG. 4 also are shown. As described below, thumbstick 700 may utilize the cap 606, cylindrical stem 608 and dome-shaped base 630 described above with reference to thumbstick 600.

In this example, cap 606 of thumbstick 700 comprises a hollow cylindrical stem 608 that defines a first cavity 610. With reference also to FIG. 2, the cap 606 and stem 608 may be positioned to extend above aperture 140 in the thumb-side surface 110 of the housing 102. A grip layer 614 comprising a top surface 616 and an opposing bottom surface 620 may be provided over body portion 624 of cap 606 to facilitate manipulation by a user's thumb and/or finger. The top surface 616 is designed to be manipulated by a user's thumb (or finger) and in this example includes a central concave portion 626. Grip layer 614 may be formed from an elastomeric material or any other material that provides a measure of frictional contact with a user's thumb and fingers.

Figure 25:
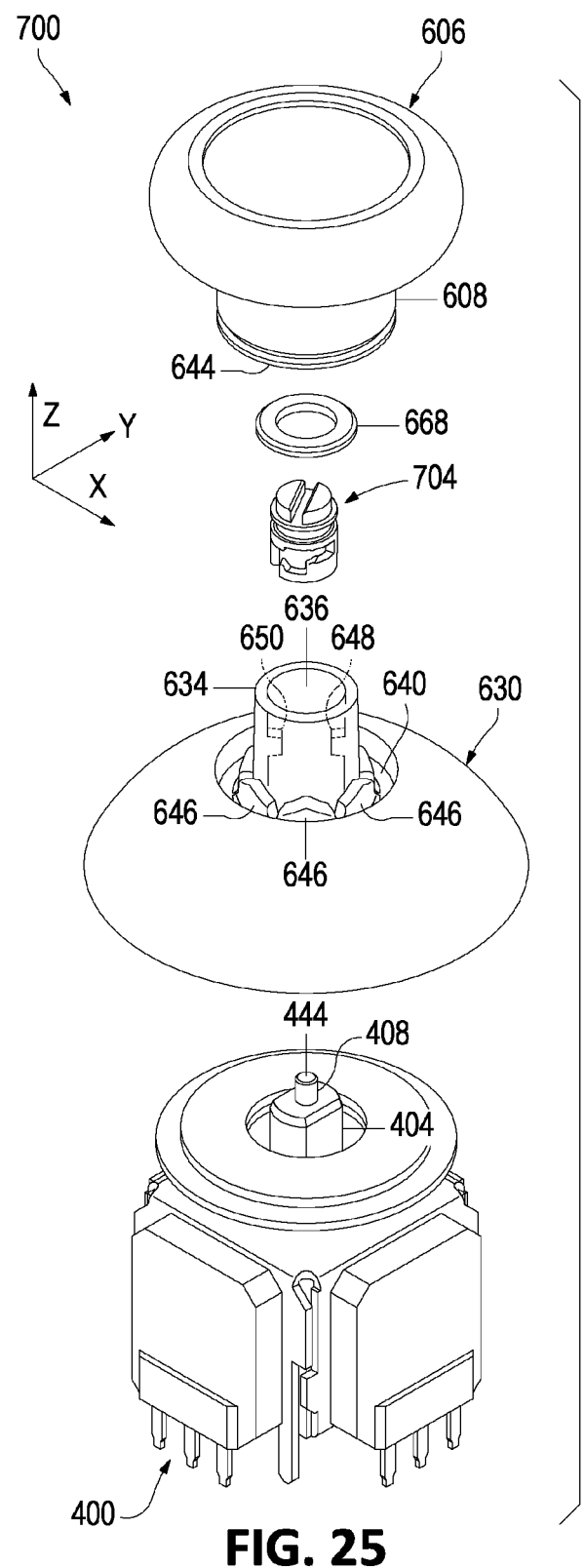
FIG. 25 is an exploded view of the thumbstick of FIG. 24 showing an adjustment body and a base including two protuberances according to examples of the present disclosure.
Figure 26:
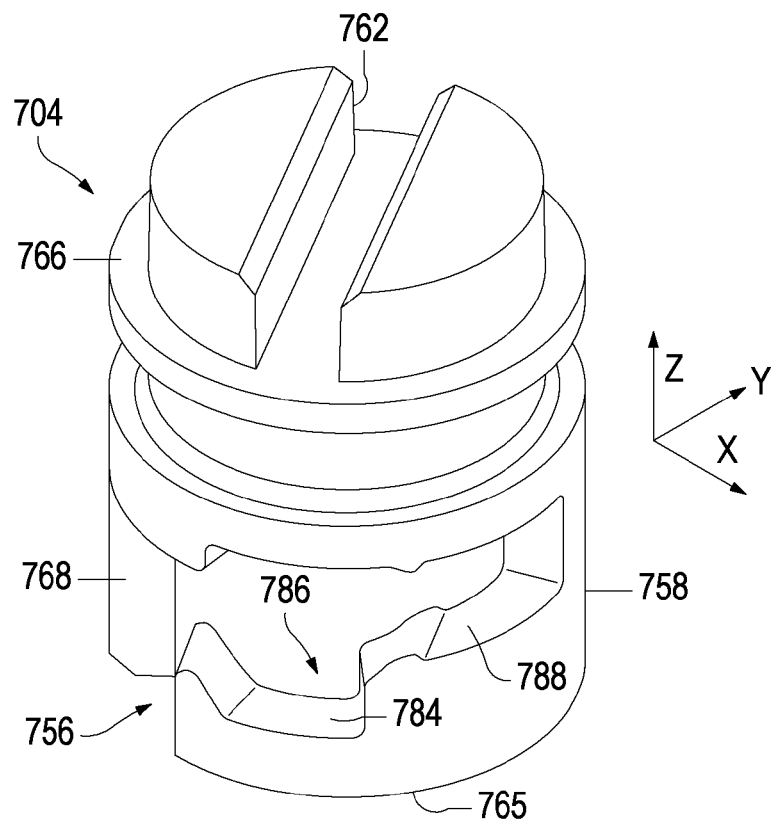
FIG. 26 shows a perspective view of the adjustment body of the thumbstick of FIG. 25 according to examples of the present disclosure.

With reference also to FIG. 25, the thumbstick 700 includes dome-shaped base 630 to which the cylindrical stem 608 of the cap 606 may be removably coupled. The base 630 is coupled to and movable with the tiltable post 404 of the adjustable tensioning mechanism 402 as described above. Dome-shaped base 630 includes a hollow cylindrical portion 634 extending upwardly in a z-axis direction into the first cavity 610 of the cap 606. In this example the cylindrical portion 634 defines a second cavity 636 (within the first cavity 610 of the cap 606) in which the adjustment body 704 is located.

The base 630 includes ring-shaped groove 640 encircling an upper portion of the base. With reference also to FIG. 25, the circular end 644 of the stem 608 is configured to extend into the groove 640 such that the cap 608 is fixedly mounted with respect to the base 630. In this example and with reference also to FIG. 18, the ring-shaped groove 640 may comprise a plurality of wedges 646 encircling the cylindrical portion 634. In some examples, the stem 608 may be pressed over the wedges 646 to be secured within the groove 640 via an interference fit with the wedges. In other examples, any suitable method for affixing the stem 608 within groove 640 may be utilized.

As described in more detail below, the cylindrical portion 634 of base 630 includes at least one protuberance that extends laterally into the second cavity 636. The adjustment body 704 includes a corresponding slot recessed into a face of the adjustment body, with the slot extending around a portion of the face. The protuberance of the cylindrical portion 634 extends into the slot. In this manner, the protuberance and slot may cooperate to comprise a "push-turn-release" configuration in which a user first pushes and translates the adjustment body 704 from a first orientation, then rotates and releases the adjustment body into a second orientation to thereby adjust the tilt tension of the tiltable post 404.

With reference now to FIGS. 24-27, in this example the cylindrical portion 634 comprises a first protuberance 648 and a second protuberance 650. In this example, the second protuberance 650 is located opposite to the first protuberance 648 along an interior surface 652 of the cylindrical portion 634. With reference also to FIG. 24, the first protuberance 648 and second protuberance 650 also may be located at the same height along the z-axis within the cylindrical portion 634. The first protuberance 648 and second protuberance 650 also may have a matching shape as illustrated and described above with respect to FIG. 20.

In this example the adjustment body 704 comprises a first slot 756 that is recessed into the face 758 of the adjustment body and extends around a portion of the face. As described in more detail below, the first slot 756 and the first protuberance 648 may guide the user's translation of the adjustment body 704 against resistance from the adjustable tensioning mechanism, and guide the subsequent rotation of the adjustment body to a different orientation to thereby adjust the tilt tension of the tiltable post 404.

In this example the adjustment body 704 also comprises a second slot 760 that is recessed into the face 758 of the adjustment body and extends around another portion of the face. The first slot 756 and second slot 760 may have a matching shape, and may be located opposite to one another on the face 758 of the adjustment body 704. In other words, the first slot 756 and second slot 760 may be located 180 degrees from one another around the circumference of the adjustment body 704.

As described in more detail below, in this example and during rotation of the adjustment body 704, the first protuberance 648 cooperates with the first slot 756 and the second protuberance 650 cooperates with the second slot 760 to guide the translation and rotation of the adjustment body and thereby adjust the tilt tension of the tiltable post 404. In other examples, 3 or more slot/protuberance pairs may be utilized. For example, in another configuration 4 protuberances spaced 90 degrees from one another and 4 corresponding slots also spaced 90 degrees from one another may be utilized.

Operation of the adjustment body 704 with the adjustable tensioning mechanism 402 according to examples will now be described. In this example and with reference again to FIG. 24, the cap 606 may be removable by a user to expose the slot 762. In this manner and as described in more detail below, a user may engage, translate and rotate the adjustment body 704 with a corresponding tool to adjust the tilt tension of the thumbstick 700. In other examples, the adjustment body 704 may be rotated directly by the user's thumb/finger to adjust the tilt tension of the thumbstick 700. For example and with reference to FIG. 24, a user may grip and rotate the adjustment body 704 at a portion extending above retainer ring 668. In some examples, the adjustment body 704 may extend further above the retainer ring 668 to facilitate gripping by a user, and/or may include an upper grippable surface, such as a circular knob.

In other examples, top surface 616 of cap 606 may include an aperture such that a tool can be inserted through cap 606 to engage adjustment body 704, such as via slot 762, and rotate the adjustment body to adjust the tilt tension of thumbstick 700 without removing cap 606. In such examples, cap 606 may be permanently affixed to base 630, and in some examples the cap and base may be formed as a single part (for example, the cap and base may be injection molded).

With reference to FIGS. 24 and 25, a contacting surface 764 at a distal end 765 of the adjustment body 704 contacts engagement surface 444 of the movable pin 408. The adjustment body 704 is movably retained within the second cavity 636 of the cylindrical portion 634 of base 630 and configured for both translation along and rotation about the axis 412 of the tiltable post 404 (parallel to the z-axis).

Figure 28:
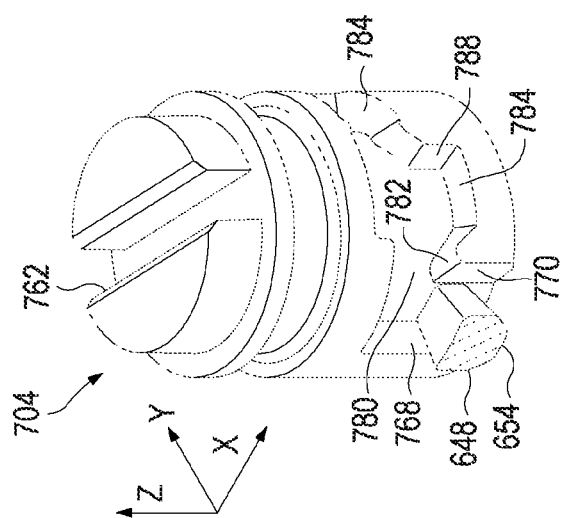
FIG. 28 is a perspective view of the adjustment body and a protuberance of the thumbstick of FIG. 25 in a minimum-tension orientation according to examples of the present disclosure.

FIGS. 24 and 28 show the adjustment body 704 in a first, minimum-tension orientation that corresponds to a minimum tilt tension setting. In this orientation, spring 430 via the movable pin 408 urges the adjustment body 704 upwardly in the z-axis direction. An upper lip 766 of the adjustment body 704 contacts a retainer ring 668 affixed to an end of the cylindrical portion 634 to retain the adjustment body in the second cavity 636 at this orientation.

As noted above, the first protuberance 648 and second protuberance 650 may have a matching shape and may be located opposite one another in the cylindrical portion 634. Similarly, the first slot 756 and second slot 760 of adjustment body 704 may have a matching shape and may be located opposite to one another on the face 758 of the adjustment body. Accordingly, the following discussion of first slot 756 and first protuberance 648 applies equally to the second slot 760 and second protuberance 650.

With reference to FIGS. 20, 26, 27 and 28, the first slot 756 comprises a first minimum-tension stop surface 768 configured to abut the side face 651 of the first protuberance 648 when the adjustment body 704 is in the minimum-tension orientation. In this manner, the first minimum-tension stop surface 768 prevents rotation of the adjustment body 704 in a decreasing-tension direction (counter-clockwise in FIG. 28) to maintain a minimum tilt tension of the thumbstick 700. In other examples, stop surface 768 may be an angled face to allow adjustment body 704 to rotate directly from a minimum tension orientation to a maximum tension orientation without passing through any intermediate tension settings by traveling in a decreasing tension direction.

The first slot 756 further comprises a second minimum-tension stop surface 770 spaced from the first minimum-tension stop surface 768. The second minimum-tension stop surface 770 is configured to abut the opposing side face 649 of the first protuberance 648 when the adjustment body 704 is in the minimum-tension orientation. In some examples, a distance from the first minimum-tension stop surface 768 to the second minimum-tension stop surface 770 may be slightly greater than a width of the first protuberance 648 between its two side faces 649 and 651 to provide a measure of rotational play to the adjustment body 704.

As described in more detail below, the first minimum-tension stop surface 768 is configured to prevent rotation of the adjustment body 704 in a decreasing-tension direction. The second minimum-tension stop surface 770 is configured to prevent rotation of the adjustment body 704 in an increasing-tension direction without a prior translation of the adjustment body toward the tiltable post 404.

Figure 27:
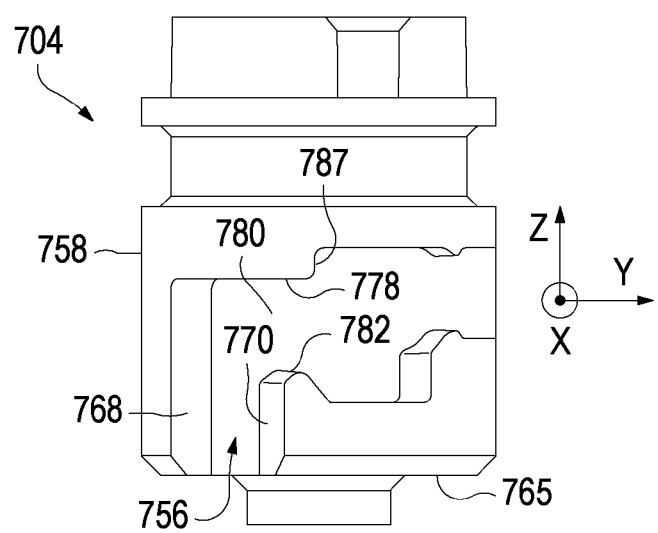
FIG. 27 shows a side view of the adjustment body of FIG. 26 according to examples of the present disclosure.

With reference to FIG. 27, the second minimum-tension stop surface 770 has a height in the z-axis direction that is less than a height of the first minimum-tension stop surface 768. In this manner, the second minimum-tension stop surface 770 in cooperation with a roof portion 778 of the first slot 756 defines a gap 780 through which the first protuberance 648 may pass via user manipulation of the adjustment body 704.

More particularly and with reference also to FIG. 28, using a tool such as a screwdriver in slot 762, a user first may press downwardly on adjustable body 704 to translate the body downwardly toward the tiltable post 404 until an uppermost surface of a first hump 782 is below the bottom surface 654 of first protuberance 648. The user may then rotate the adjustment body 704 in an increasing-tension direction (clockwise in FIG. 28), and then lessen the downward force exerted on the adjustable body by the screwdriver to allow the opposing upward force of spring 430 to seat the first protuberance 648 in a first flat portion 784 of the bottom surface 786 of the first slot 756. This first flat portion 784 corresponds to a second, intermediate-tension orientation of the adjustment body 704.

At this second orientation, force from the spring 430 on the adjustment body 704 (e.g., resistance from the spring to the user's downward force) seats the first protuberance 648 on the first flat portion 784, wherein contact between the first protuberance and the bottom surface 786 may generates tactile feedback, such as a click, tap or other touch-perceptible feedback, that may be felt by the user via the game controller 100. Such tactile feedback also may indicate a selected tilt tension. In this manner, this configuration enables a user to easily adjust, locate and set the tilt tension of the thumbstick 700 to an intermediate-tension setting.

Figure 29:
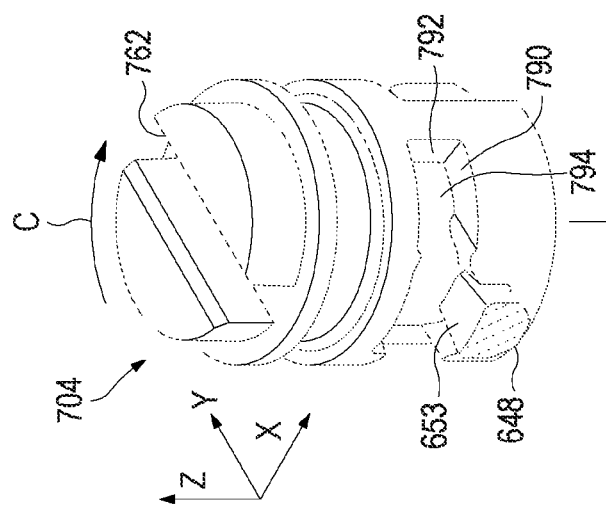
FIG. 29 shows a perspective view of the adjustment body and protuberance of FIG. 28 in another tension orientation greater than the minimum-tension orientation according to examples of the present disclosure.

In this example, the first flat portion 784 is elevated as compared to the distal end 765 of the adjustment body 704. Accordingly and as shown in FIG. 29, the first flat portion 784 corresponds to an intermediate-tension orientation of the adjustment body 704 in which the first protuberance 648 is located at the first flat potion 784, and the tilt tension of the tiltable post 404 is greater than the tension at the minimum-tension orientation.

At this location and with reference to FIG. 28, the first slot 756 also may comprise an intermediate tension stop surface 788. When the first protuberance 648 is located at the first flat portion 784, the vertical face of the intermediate tension stop surface 788 may be configured to abut the opposing side face 649 of the first protuberance 648. Like the second minimum-tension stop surface 770 described above, the intermediate-tension stop surface 788 is configured to prevent rotation of the adjustment body 704 in an increasing-tension direction without a prior translation of the adjustment body toward the tiltable post 404.

In some examples and as shown in FIGS. 27 and 28, the roof portion 778 of the first slot 756 may include a stepped portion 787 located opposite to the first hump 782 across the gap 780. From the minimum tension orientation of FIG. 28 the user may press downwardly on adjustment body 704 until roof portion 778 contacts the top surface 653 of the first protuberance 648, which may signal to the user that rotation of the adjustment body in the increasing-tension direction is now available. The user may then rotate the adjustment body 704 in the increasing-tension direction such that the roof portion 778 slides laterally along top surface 653 of the first protuberance 648 until the top surface slides past the stepped portion 787.

As the top surface slides past the stepped portion 787, the first protuberance 648 will translate downwardly in the z-axis direction under downward pressure from the user such that its top surface 653 contacts the roof portion 778 at a location above the first flat portion 784. Such contact may provide tactile feedback to the user indicating that lessening the downward pressure on the adjustment body 704 may seat the body in the intermediate tension orientation.

Figure 30:
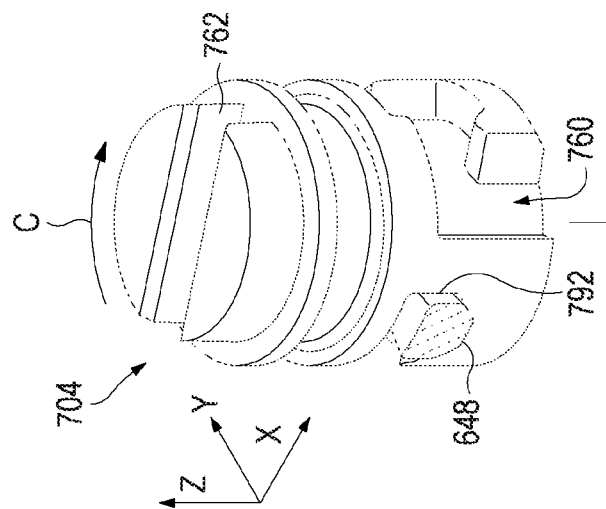
FIG. 30 shows a perspective view of the adjustment body and protuberance of FIG. 28 in a maximum tension orientation according to examples of the present disclosure.

The user may further manipulate the adjustment body 704 with a similar "push-turn-release" action to move the adjustment body to a maximum-tension orientation as shown in FIG. 30. In the present example, a second flat portion 790 may be located between the intermediate-tension stop surface 788 and a maximum-tension stop surface 792. In this example the maximum-tension stop surface 792 is a vertical surface extending from an inner wall 794 of the first slot 756. The maximum-tension stop surface 792 is configured to abut the side face 649 of the first protuberance 648 when the adjustment body 704 is in the maximum-tension orientation shown in FIG. 30. In this manner, the maximum-tension stop surface 792 prevents rotation of the adjustment body 704 in an increasing-tension direction (clockwise in FIG. 30) to maintain a maximum tilt tension of the thumbstick 600.

In some examples, between the minimum-tension orientation of FIG. 28 and the maximum tension setting of FIG. 30, the adjustment body 704 may translate a distance along the z-axis of between about 0.7 mm and 1.7 mm, or between about 1.0 mm and about 1.4 mm, or about 1.2 mm. In other examples, any suitable translation distance may be utilized.

Additionally and with reference also to FIG. 2, in this example a user may adjust thumbstick 700/130A/130B to a plurality of tilt tension settings without changing a height of the thumbstick relative to the thumb-side surface 110 of the game controller housing 102. In other words, a height H of the thumbstick cap above the surface of a user input device at the first tilt tension is equal to the height H of the cap above the surface of the user input device at a second tilt tension.

Figure 31:
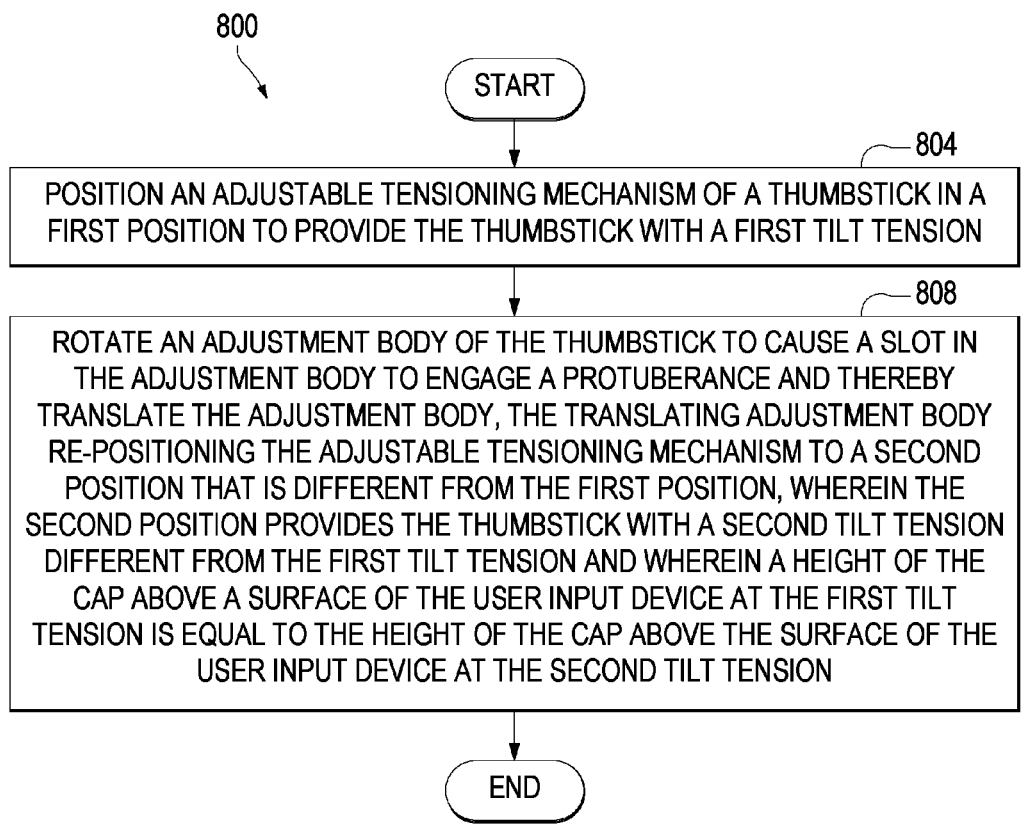
FIG. 31 shows a method for adjusting a tilt tension of a thumbstick of a user input device according to examples of the present disclosure.

FIG. 31 illustrates a flow chart of a method 800 for adjusting a tilt tension of a thumbstick of a user input device, where the thumbstick comprises a cap configured to receive user manipulation, according to an example of the present disclosure. The following description of method 800 is provided with reference to the components and use case scenarios described above and shown in FIGS. 14-30. It will be appreciated that method 800 also may be performed in other contexts using other suitable components.

With reference to FIG. 31, at 804 the method 800 may include positioning an adjustable tensioning mechanism in a first position to provide the thumbstick with a first tilt tension. At 808 the method 800 may include rotating an adjustment body of the thumbstick to cause a slot in the adjustment body to engage a protuberance and translate the adjustment body, the translating adjustment body re-positioning the adjustable tensioning mechanism to a second position that is different from the first position, wherein the second position provides the thumbstick with a second tilt tension different from the first tilt tension, and wherein a height of the cap above a surface of the user input device at the first tilt tension is equal to the height of the cap above the surface of the user input device at the second tilt tension.

It will be appreciated that method 800 is provided by way of example and is not meant to be limiting. Therefore, it is to be understood that method 800 may include additional and/or alternative steps relative to those illustrated in FIG. 31. Further, it is to be understood that method 800 may be performed in any suitable order. Further still, it is to be understood that one or more steps or portions of a step may be omitted from method 800 without departing from the scope of this disclosure.

The following paragraphs provide additional support for the claims of the subject application. One aspect provides a thumbstick for a user input device, comprising: an adjustable tensioning mechanism configured to modify a tilt tension of a tiltable post, wherein the tiltable post is operable to output a control signal based on a position of the tiltable post relative to a default position; a cap comprising a cylindrical stem that defines a cavity; an engagement body located within the cavity of the stem and contacting an engagement surface of the adjustable tensioning mechanism, the engagement body comprising a cam surface disposed around an axis of the tiltable post; and an adjustment body within the cavity of the stem and comprising a follower contacting the cam surface, the follower configured to traverse the cam surface when the cap is rotated to thereby translate the engagement body along the axis of the tiltable post and adjust the tilt tension of the tiltable post The thumbstick may additionally or alternatively include, wherein the cam surface is an outer cam surface and the follower is an outer follower, the engagement body further comprising an inner cam surface disposed around the axis of the tiltable post between the axis and the outer cam surface, and the adjustment body further comprises an inner follower configured to traverse the inner cam surface when the cap is rotated. The thumbstick may additionally or alternatively include, wherein the outer follower comprises an outer distal end that contacts the outer cam surface at an outer contact point, and the inner follower comprises an inner distal end that contacts the inner cam surface at an inner contact point, wherein the outer contact point and the inner contact point remain at a constant location along the axis of the tiltable post during rotation of the cap. The thumbstick may additionally or alternatively include, wherein the engagement surface of the adjustable tensioning mechanism comprises an end of a movable pin that is slidably received in an opening of the tiltable post. The thumbstick may additionally or alternatively include, wherein the engagement body is configured to translate along the axis of the tiltable post without rotating. The thumbstick may additionally or alternatively include, wherein the engagement body comprises a minimum-tension stop surface configured to abut the follower of the adjustment body and prevent rotation of the adjustment body in a decreasing-tension direction when the adjustment body is in a minimum-tension orientation. The thumbstick may additionally or alternatively include, wherein the engagement body further comprises a maximum-tension stop surface configured to abut the follower of the adjustment body and prevent rotation of the adjustment body in an increasing-tension direction when the adjustment body is in a maximum tension orientation. The thumbstick may additionally or alternatively include, wherein the cam surface comprises a plurality of sloping portions and a plurality of flat portions, wherein each of the flat portions corresponds to a different tilt tension of the tiltable post. The thumbstick may additionally or alternatively include a base that is movable with the tiltable post, the base comprising: a ring-shaped groove comprising a plurality of alternating ridges and valleys, wherein each of the plurality of valleys comprises a bottom-most surface that is in a common plane with other bottom-most surfaces of the other valleys; and a magnet mounted below the ring-shaped groove; wherein the cylindrical stem of the cap is made at least partially of ferromagnetic material and comprises a circular end with a plurality of mating alternating ridges and valleys that are configured to mate with the plurality of alternating ridges and valleys of the ring-shaped groove, the magnet attracting the circular end into the ring-shaped groove; and the cap and cylindrical stem are configured to be rotated relative to the base via user manipulation of the cap to cause the plurality of mating ridges and valleys to move relative to the plurality of alternating ridges and valleys of the ring-shaped groove from a first orientation corresponding to a first tilt tension to a second orientation corresponding to a second tilt tension. The thumbstick may additionally or alternatively include, wherein: when the cylindrical stem and the ring-shaped groove are in the first orientation, the follower of the adjustment body is positioned at a first flat portion of the plurality of flat portions of the cam surface; and when the cylindrical stem and the ring-shaped groove are in the second orientation, the follower of the adjustment body is positioned at a second flat portion of the plurality of flat portions of the cam surface. The thumbstick may additionally or alternatively include, wherein when the cap is rotated to slide the mating ridges of the circular end over the ridges of the ring-shaped groove and into the valleys of the groove, contact between the mating ridges and the bottom-most surfaces of the valleys generates tactile feedback indicating a selected tension setting. The thumbstick may additionally or alternatively include, wherein the adjustment body is configured to rotate in a plane perpendicular to the axis of the tiltable post without translating along the axis.

Another aspect provides a user input device, comprising: a housing that defines an internal chamber and includes an aperture; and a thumbstick having a portion that extends from the aperture, the thumbstick comprising: an adjustable tensioning mechanism disposed within the chamber and configured to modify a tilt tension of a tiltable post, wherein the tiltable post is operable to output a control signal based on a position of the tiltable post relative to a default position; a cap comprising a cylindrical stem that defines a cavity; an engagement body located within the cavity of the stem and contacting an engagement surface of the adjustable tensioning mechanism, the engagement body comprising a cam surface disposed around an axis of the tiltable post; and an adjustment body within the cavity of the stem and comprising a follower contacting the cam surface, the follower configured to traverse the cam surface when the adjustment body is rotated to thereby translate the engagement body along the axis of the tiltable post and adjust the tilt tension of the tiltable post. The user input device may additionally or alternatively include, wherein the cam surface is an outer cam surface and the follower is an outer follower, the engagement body further comprising an inner cam surface disposed around the axis of the tiltable post between the axis and the outer cam surface, and the adjustment body further comprises an inner follower configured to traverse the inner cam surface when the adjustment body is rotated. The user input device may additionally or alternatively include, wherein the outer follower comprises an outer distal end that contacts the outer cam surface at an outer contact point, and the inner follower comprises an inner distal end that contacts the inner cam surface at an inner contact point, wherein the outer contact point and the inner contact point remain at a constant location along the axis of the tiltable post during rotation of the adjustment body. The user input device may additionally or alternatively include, wherein the engagement body comprises a minimum-tension stop surface configured to abut the follower of the adjustment body and prevent rotation of the adjustment body in a decreasing-tension direction when the adjustment body is in a minimum-tension orientation. The user input device may additionally or alternatively include, wherein the engagement body further comprises a maximum-tension stop surface configured to abut the follower of the adjustment body and prevent rotation of the adjustment body in an increasing-tension direction when the adjustment body is in a maximum tension orientation. The user input device may additionally or alternatively include, wherein the cam surface comprises a plurality of sloping portions and a plurality of flat portions, wherein each of the flat portions corresponds to a different tilt tension of the tiltable post. The user input device may additionally or alternatively include a base that is movable with the tiltable post, the base comprising: a ring-shaped groove comprising a plurality of alternating ridges and valleys, wherein each of the plurality of valleys comprises a bottom-most surface that is in a common plane with other bottom-most surfaces of the other valleys; and a magnet mounted below the ring-shaped groove; wherein the cylindrical stem of the cap is made at least partially of ferromagnetic material and comprises a circular end with a plurality of mating alternating ridges and valleys that are configured to mate with the plurality of alternating ridges and valleys of the ring-shaped groove, the magnet attracting the circular end into the ring-shaped groove; and the cap and cylindrical stem are configured to be rotated relative to the base via user manipulation of the cap to cause the plurality of mating ridges and valleys to move relative to the plurality of alternating ridges and valleys of the ring-shaped groove from a first orientation corresponding to a first tilt tension to a second orientation corresponding to a second tilt tension.

Another aspect provides a method for adjusting a tilt tension of a thumbstick of a user input device, the method comprising: positioning an adjustable tensioning mechanism in a first position to provide the thumbstick with a first tilt tension; and rotating a cap of the thumbstick to rotate an adjustment body, the rotating adjustment body translating an engagement body, the translating engagement body re-positioning the adjustable tensioning mechanism to a second position that is different from the first position, wherein the second position provides the thumbstick with a second tilt tension different from the first tilt tension, and wherein a height of the cap above a surface of the user input device at the first tilt tension is equal to the height of the cap above the surface of the user input device at the second tilt tension.

It will be understood that the configurations and/or approaches described herein are exemplary in nature, and that these specific embodiments or examples are not to be considered in a limiting sense, because numerous variations are possible. The specific routines or methods described herein may represent one or more of any number of operational strategies. As such, various acts illustrated and/or described may be performed in the sequence illustrated and/or described, in other sequences, in parallel, or omitted Likewise, the order of the above-described processes may be changed.

The subject matter of the present disclosure includes all novel and nonobvious combinations and subcombinations of the various features disclosed herein, as well as any and all equivalents thereof.

The invention claimed is:

1. A thumbstick for a user input device, comprising:
an adjustable tensioning mechanism configured to modify a tilt tension of a tiltable post, wherein the tiltable post is operable to output a control signal based on a position of the tiltable post relative to a default position;
a cap comprising a cylindrical stem that defines a cavity;
an engagement body located within the cavity of the stem and contacting an engagement surface of the adjustable tensioning mechanism, the engagement body comprising a cam surface disposed around an axis of the tiltable post; and
an adjustment body within the cavity of the stem and comprising a follower contacting the cam surface, the follower configured to traverse the cam surface when the cap is rotated to thereby translate the engagement body along the axis of the tiltable post and adjust the tilt tension of the tiltable post.

2. The thumbstick of claim 1, wherein the cam surface is an outer cam surface and the follower is an outer follower, the engagement body further comprising an inner cam surface disposed around the axis of the tiltable post between the axis and the outer cam surface, and the adjustment body further comprises an inner follower configured to traverse the inner cam surface when the cap is rotated.

3. The thumbstick of claim 2, wherein the outer follower comprises an outer distal end that contacts the outer cam surface at an outer contact point, and the inner follower comprises an inner distal end that contacts the inner cam surface at an inner contact point, wherein the outer contact point and the inner contact point remain at a constant location along the axis of the tiltable post during rotation of the cap.

4. The thumbstick of claim 1, wherein the engagement surface of the adjustable tensioning mechanism comprises an end of a movable pin that is slidably received in an opening of the tiltable post.

5. The thumbstick of claim 1, wherein the engagement body is configured to translate along the axis of the tiltable post without rotating.

6. The thumbstick of claim 1, wherein the engagement body comprises a minimum-tension stop surface configured to abut the follower of the adjustment body and prevent rotation of the adjustment body in a decreasing-tension direction when the adjustment body is in a minimum-tension orientation.

7. The thumbstick of claim 6, wherein the engagement body further comprises a maximum-tension stop surface configured to abut the follower of the adjustment body and prevent rotation of the adjustment body in an increasing-tension direction when the adjustment body is in a maximum tension orientation.

8. The thumbstick of claim 1, wherein the cam surface comprises a plurality of sloping portions and a plurality of flat portions, wherein each of the flat portions corresponds to a different tilt tension of the tiltable post.

9. The thumbstick of claim 8, further comprising a base that is movable with the tiltable post, the base comprising:
 a ring-shaped groove comprising a plurality of alternating ridges and valleys, wherein each of the plurality of valleys comprises a bottom-most surface that is in a common plane with other bottom-most surfaces of the other valleys; and
 a magnet mounted below the ring-shaped groove;
 wherein the cylindrical stem of the cap is made at least partially of ferromagnetic material and comprises a circular end with a plurality of mating alternating ridges and valleys that are configured to mate with the plurality of alternating ridges and valleys of the ring-shaped groove, the magnet attracting the circular end into the ring-shaped groove; and
 the cap and cylindrical stem are configured to be rotated relative to the base via user manipulation of the cap to cause the plurality of mating ridges and valleys to move relative to the plurality of alternating ridges and valleys of the ring-shaped groove from a first orientation corresponding to a first tilt tension to a second orientation corresponding to a second tilt tension.

10. The thumbstick of claim 9, wherein:
 when the cylindrical stem and the ring-shaped groove are in the first orientation, the follower of the adjustment body is positioned at a first flat portion of the plurality of flat portions of the cam surface; and
 when the cylindrical stem and the ring-shaped groove are in the second orientation, the follower of the adjustment body is positioned at a second flat portion of the plurality of flat portions of the cam surface.

11. The thumbstick of claim 10, wherein when the cap is rotated to slide the mating ridges of the circular end over the ridges of the ring-shaped groove and into the valleys of the groove, contact between the mating ridges and the bottom-most surfaces of the valleys generates tactile feedback indicating a selected tension setting.

12. The thumbstick of claim 1, wherein the adjustment body is configured to rotate in a plane perpendicular to the axis of the tiltable post without translating along the axis.

13. A user input device, comprising:
 a housing that defines an internal chamber and includes an aperture; and
 a thumbstick having a portion that extends from the aperture, the thumbstick comprising:
  an adjustable tensioning mechanism disposed within the chamber and configured to modify a tilt tension of a tiltable post, wherein the tiltable post is operable to output a control signal based on a position of the tiltable post relative to a default position;
  a cap comprising a cylindrical stem that defines a cavity;
  an engagement body located within the cavity of the stem and contacting an engagement surface of the adjustable tensioning mechanism, the engagement body comprising a cam surface disposed around an axis of the tiltable post; and
  an adjustment body within the cavity of the stem and comprising a follower contacting the cam surface, the follower configured to traverse the cam surface when the adjustment body is rotated to thereby translate the engagement body along the axis of the tiltable post and adjust the tilt tension of the tiltable post.

14. The user input device of claim 13, wherein the cam surface is an outer cam surface and the follower is an outer follower, the engagement body further comprising an inner cam surface disposed around the axis of the tiltable post between the axis and the outer cam surface, and the adjustment body further comprises an inner follower configured to traverse the inner cam surface when the adjustment body is rotated.

15. The user input device of claim 14, wherein the outer follower comprises an outer distal end that contacts the outer cam surface at an outer contact point, and the inner follower comprises an inner distal end that contacts the inner cam surface at an inner contact point, wherein the outer contact point and the inner contact point remain at a constant location along the axis of the tiltable post during rotation of the adjustment body.

16. The user input device of claim 13, wherein the engagement body comprises a minimum-tension stop surface configured to abut the follower of the adjustment body and prevent rotation of the adjustment body in a decreasing-tension direction when the adjustment body is in a minimum-tension orientation.

17. The user input device of claim 16, wherein the engagement body further comprises a maximum-tension stop surface configured to abut the follower of the adjustment body and prevent rotation of the adjustment body in an increasing-tension direction when the adjustment body is in a maximum tension orientation.

18. The user input device of claim 13, wherein the cam surface comprises a plurality of sloping portions and a plurality of flat portions, wherein each of the flat portions corresponds to a different tilt tension of the tiltable post.

19. The user input device of claim 18, further comprising a base that is movable with the tiltable post, the base comprising:
- a ring-shaped groove comprising a plurality of alternating ridges and valleys, wherein each of the plurality of valleys comprises a bottom-most surface that is in a common plane with other bottom-most surfaces of the other valleys; and
- a magnet mounted below the ring-shaped groove;
- wherein the cylindrical stem of the cap is made at least partially of ferromagnetic material and comprises a circular end with a plurality of mating alternating ridges and valleys that are configured to mate with the plurality of alternating ridges and valleys of the ring-shaped groove, the magnet attracting the circular end into the ring-shaped groove; and
- the cap and cylindrical stem are configured to be rotated relative to the base via user manipulation of the cap to cause the plurality of mating ridges and valleys to move relative to the plurality of alternating ridges and valleys of the ring-shaped groove from a first orientation corresponding to a first tilt tension to a second orientation corresponding to a second tilt tension.

20. A method for adjusting a tilt tension of a thumbstick of a user input device, the method comprising:
- positioning an adjustable tensioning mechanism in a first position to provide the thumbstick with a first tilt tension; and
- rotating a cap of the thumbstick to rotate an adjustment body, the rotating adjustment body translating an engagement body, the translating engagement body re-positioning the adjustable tensioning mechanism to a second position that is different from the first position, wherein the second position provides the thumbstick with a second tilt tension different from the first tilt tension, and wherein a height of the cap above a surface of the user input device at the first tilt tension is equal to the height of the cap above the surface of the user input device at the second tilt tension.

\* \* \* \* \*